(12) United States Patent
Han et al.

(10) Patent No.: US 11,361,004 B2
(45) Date of Patent: Jun. 14, 2022

(54) EFFICIENT DATA RELATIONSHIP MINING USING MACHINE LEARNING

(71) Applicant: SAP SE, Walldorf (DE)

(72) Inventors: Wei Han, Karlsruhe (DE); Markus Adam, Delmenhorst (DE)

(73) Assignee: SAP SE, Walldorf (DE)

( * ) Notice: Subject to any disclaimer, the term of this patent is extended or adjusted under 35 U.S.C. 154(b) by 779 days.

(21) Appl. No.: 16/017,799

(22) Filed: Jun. 25, 2018

(65) Prior Publication Data

US 2019/0392075 A1 Dec. 26, 2019

(51) Int. Cl.
   *G06F 16/28* (2019.01)
   *G06N 5/04* (2006.01)
   *G06N 20/00* (2019.01)
   *G06F 3/0481* (2022.01)

(52) U.S. Cl.
   CPC .......... *G06F 16/288* (2019.01); *G06F 16/287* (2019.01); *G06N 5/046* (2013.01); *G06N 20/00* (2019.01); *G06F 3/0481* (2013.01)

(58) Field of Classification Search
   CPC .... G06F 16/288; G06F 16/287; G06F 3/0481; G06N 20/00; G06N 5/046
   See application file for complete search history.

(56) References Cited

U.S. PATENT DOCUMENTS

| | | | | |
|---|---|---|---|---|
| 7,480,640 B1* | 1/2009 | Elad | ................... | G06Q 10/10 706/14 |
| 10,789,525 B2* | 9/2020 | Kerr | ................... | G06F 3/04842 |
| 2002/0038307 A1* | 3/2002 | Obradovic | ........... | G06K 9/6253 |
| 2005/0065955 A1* | 3/2005 | Babikov | ............... | G06F 16/951 |
| 2007/0250522 A1* | 10/2007 | Perrizo | ................... | G06N 20/00 |
| 2011/0004578 A1* | 1/2011 | Momma | ................ | G06N 20/00 706/12 |
| 2012/0278321 A1* | 11/2012 | Traub | ................... | G06F 16/3331 707/736 |
| 2013/0198565 A1* | 8/2013 | Mancoridis | ........... | G06F 21/554 714/26 |
| 2013/0204657 A1 | 8/2013 | Ghosh et al. | | |
| 2016/0148222 A1* | 5/2016 | Davar | ................ | G06Q 30/0201 705/7.32 |

OTHER PUBLICATIONS

"Association Rule Learning," *Wikipedia*, retrieved from https://en.wikipedia.org/wiki/Association_rule_learning#Eclat_algorithm on or before Sep. 14, 2018, 11 pages.

(Continued)

*Primary Examiner* — Alford W Kindred
*Assistant Examiner* — Lin Lin M Htay
(74) *Attorney, Agent, or Firm* — Klarquist Sparkman, LLP

(57) ABSTRACT

Techniques and solutions are described for determining relationships in data with improved efficiency, including computing resource use. A plurality of attributes are selected for analysis. The attributes can be processed, such as to facilitate relationship determination. Relationships between attribute values are determined. Redundant relationships can be removed. Distances are determined between relationships and used to select a sample of relationships. The sample is labelled by a user and used to train a machine learning classifier. The machine learning classifier labels determined relationships.

20 Claims, 17 Drawing Sheets

(56) References Cited

OTHER PUBLICATIONS

"Association Rule Mining for High Dimensional Master Data," *Smart Data Innovation Lab*, retrieved from http://www.sdil.de/en/projects/association-rule-mining-for-high-dimensional-master-data/ on or before Jun. 2018, 2 pages.
"Decision Tree Learning," *Wikipedia*, retrieved from https://en.wikipedia.org/wiki/Decision_tree_learning on or before Jun. 2018, 9 pages.
"Determining the number of clusters in a data set," *Wikipedia*, retrieved from https://en.wikipedia.org/wiki/Determining_the_numbers_of_clusters_in_a_data_set on or before Jun. 2018, 5 pages.
"Distance Matrix," *Wikipedia*, retrieved from https://en.wikipedia.org/wiki/Distance_matrix#Hierarchical_Clustering on or before Jun. 2018, 4 pages.
"Hierarchical Clustering," *Wikipedia*, retrieved from https://en.wikipedia.org/wiki/Hierarchical_clustering#Agglomerative_clustering_example on or before Jun. 2019, 7 pages.
"Is the Jaccard distance a distance?" *MathOverflow*, retrieved from https://mathoverflow.net/questions/18084/is-the-jaccard-distance-a-distance on or before Jun. 2018, 12 pages.
"Random Forest," *Wikipedia*, retrieved from https://en.wikipedia.org/wiki/Random_forest on or before Jun. 2018, 10 pages.
"Vector Quantization," *Wikipedia*, retrieved from https://en.wikipedia.org/wiki/Vector_quantization on or before Jun. 2018, 5 pages.
Breiman, L., "Random Forests," *Machine Learning* 45, No. 1: 5-32 (2001). Retrieved from https://link.springer.com/article/10.1023/A:1010933404324 on or before Jun. 2018, 28 pp.
Han, W. et al., "Interestingness Classification of Association Rules for Master Data," *Industrial Conference on Data Mining*, Springer, pp. 237-245 (2017).
Han, W. et al., "Business Rule Mining approach for material master records using machine learning," *1st Smart Data Innovation Conference, Smart Data Innovation Lab*, Karlsruhe, Oct. 12-13, 2016, 1 p.
Han, W. et al., "Interestingness Classification of Association Rules for Master Data," *1st Smart Data Innovation Conference, Smart Data Innovation Lab*, Karlsruhe, Oct. 12-13, 2016, pp. 48-55.
Strehl, A. et al., "Distance based clustering of association rules," *Proceedings of ANNIE*, vol. 9, No. 1999, pp. 759-764 (1999).
Terzi, E., "Measuring Distance/Similarity of Data Objects," *Computer Science, Boston University*, retrieved from http://cs-people.bu.edu/evimaria/cs565-14/lect2.pdf on or before Sep. 14, 2018, 27 pages.
Zaki, M., "Generating Non-Redundant Association Rules," retrieved from http://www.cs.tau.ac.il/~fiat/dmsem03/Generating%20Non-Redundant%20Association%20Rules%20-%202000.pdf on or before Jun. 2018, 10 pp.

\* cited by examiner

FIG. 2

| ID | Group | Type | Attribute 1 | Attribute 2 |
|---|---|---|---|---|
| ID001 | 1A | ABCD | 2.45 | X |
| ID002 | 2A | ABCD | 1.23 | Y |

FIG. 3

| Item ID | Item Value |
|---|---|
| 1 | ID = ID001 |
| 2 | Group = 1A |
| 3 | Type = ABCD |
| 4 | Attribute 2 = X |
| 5 | ID = ID002 |
| 6 | Group = 2A |
| 7 | Type = ABCD |
| 8 | Attribute 2 = Y |

FIG. 4

| Transaction ID | Item ID |
|---|---|
| 1 | 1 |
| 1 | 2 |
| 1 | 3 |
| 1 | 4 |
| 2 | 5 |
| 2 | 6 |
| 2 | 7 |
| 2 | 8 |

Attribute

| | A | B | C | D | E | F | ... | m |
|---|---|---|---|---|---|---|---|---|
| 1 | 1 | 1 | 1 | 0 | 0 | 0 | ... | 0 |
| 2 | 0 | 1 | 0 | 0 | 0 | 1 | ... | 0 |
| 3 | 0 | 0 | 1 | 0 | 1 | 1 | ... | 0 |
| 4 | 1 | 1 | 0 | 0 | 1 | 1 | ... | 0 |
| ... | ... | ... | ... | ... | ... | ... | ... | ... |
| n | 1 | 0 | 1 | 1 | 1 | 0 | ... | 0 |

Rule#

FIG. 6

Rule#

| | 1 | 2 | 3 | 4 | ... | n |
|---|---|---|---|---|---|---|
| 1 | 0 | .33 | .66 | .33 | ... | .25 |
| 2 | .33 | 0 | .25 | 0 | ... | .40 |
| 3 | .66 | .25 | 0 | .75 | ... | .75 |
| 4 | .33 | 0 | .75 | 0 | ... | .33 |
| ... | ... | ... | ... | ... | | |
| n | .25 | .40 | .75 | .33 | ... | 0 |

Rule#

FIG. 7

*Search for Attribute*

| Prerule | Postrule | Support | Confidence | Rating |
|---|---|---|---|---|
| /CWM/VALUM=EA | DISST=null | 0.88 | 0.91 | ★★★☆☆ |
| DISST=null | /CWM/VALUM=EA | 0.79 | 0.95 | ★★☆☆☆ |
| NORMT=null | /CWM/VALUM=EA | 0.91 | 1.0 | ★★★★★ |
| LVORM=null | /CWM/VALUM=EA | 0.63 | 0.94 | ★★★★★ |
| /CWM/VALUM=EA | MTART=ZSP | 0.61 | 1.0 | ★★★☆☆ |
| BISMT=null | /CWM/VALUM=EA | 0.97 | 0.97 | ★★★☆☆ |
| MEINS=EA | DISST=null | 0.88 | 0.91 | ★★★★★ |
| LVORM=null | DISST=null | 0.93 | 1.0 | ★★★★☆ |
| MSTAE=null | LVORM=null | 0.90 | 1.0 | ★★★☆☆ |

FIG. 13

EFFICIENT DATA RELATIONSHIP MINING USING MACHINE LEARNING

The present disclosure generally relates to analyzing relationships between data. Particular implementations relate to the training or use of a machine learning-based classifier for classifying such relationships.

BACKGROUND

As computers become more pervasive, opportunities exist for determining relationships between data that may be generated or acquired. For example, relationships between data, which can be expressed as rules, can be used to determine whether particular types of data are associated with each other. The presence of these rules can be used for a variety of purposes, including optimizing various processes, or to obtain insights that might be exploited in other ways. However, problems can arise when analyzing large data sets, particularly in specialized fields.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for determining relationships in data with improved efficiency, including computing resource use. A plurality of attributes are selected for analysis. The attributes can be processed, such as to facilitate relationship determination. Relationships between attribute values are determined. Redundant relationships can be removed. Distances are determined between relationships and used to select a sample of relationships. The sample is labelled by a user and used to train a machine learning classifier. The machine learning classifier labels determined relationships.

A method is provided for automatically labelling data relationships using a machine learning classifier in a process that can provide improved efficiency. A plurality of attributes, or fields, are retrieved for at least one database table. At least a portion of the attributes are selected. The selected attributes are those to be analyzed for relationships among the selected attributes. A plurality of relationships among the selected at least a portion of the attributes are determined. One or more redundant relationships of the plurality of determined relationships are determined. The one or more redundant relationships are removed from a set that includes the plurality of determined relationships. Distances are determined between relationships of the set. The distances are calculated using rule antecedents and rule consequents of the relationships, or otherwise using attributes values that constitute the relationships.

A sample of relationships is selected from the set. The sample includes multiple relationships of the relationships in the set, but less than all of them. User input is received assigning labels to relationships of the sample. A machine learning classifier is constructed, or trained, based at least in part on the relationships of the sample and their associated labels. At least a portion of the relationships of the set are classified using the machine learning classifier. The classifying includes determining labels for relationships of the set and associating the labels with respective relationships. At least a portion of the relationships classified by the machine learning classifier, and their associated labels, are output for display.

According to another embodiment, a method is provided for implementing a wizard that can be presented to a user to guide the user through the process of automatically determining and labelling relationships between attributes, or fields, associated with data. A first user interface screen is presented. The first user interface screen displays a plurality of attributes, such as fields of one or more relational database tables, that are selectable for relationship analysis. First user input is received selecting multiple attributes of the plurality of attributes for analysis. A second user interface screen is presented. The second user interface screen presents one or more analysis configuration options to a user. The one or more analysis configuration options include a number of samples to be manually labelled. Second user input is received, indicating a number of samples to be manually labelled.

A third user interface screen is presented. The third user interface screen displays a sample set that includes a plurality of relationships to be labelled by a user and one or more user input elements associated with the plurality of relationships and indicating a labelling to be applied to a respective relationship. Third user input is received indicating labels to be applied to the plurality of relationships of the sample set.

A fourth user interface screen is presented. The fourth user interface screen displays a plurality of relationships and associated labels determined by a machine learning classifier trained at least in part using the labels applied to the plurality of relationships of the sample set.

According to a further aspect, a method is provided for automatically labelling, or categorizing, association rules determined from attributes of one or more database tables. A plurality of association rules for a plurality of fields of one or more database tables are determined. Distances between at least a portion of the determined association rules are determined. The distances are determined based on attributes values in rule pairs. A sample set of association rules is selected based at least in part on the determined distances.

User input associating labels with association rules of the sample set is received. A machine learning classifier is trained based at least in part on the user input. At least a portion of the determined association rules are classified using the machine learning classifier. The classifying includes determining at least one label to be applied to a respective rule. At least a portion of the association rules classified by the machine learning classifier, and their associated labels, are output for display.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2 is an example table of database transactions or records having attributes.

FIG. 3 is a table associating attribute values with encoded values.

FIG. 4 is table associating database transactions with encoded attribute values associated with respective transactions.

FIG. 5 illustrates how a plurality of association rules can be associated with a common association rule identifier.

FIG. 6 illustrates an example binary matrix of attribute values for association rules.

FIG. 7 presents an example distance matrix summarizing distances between pairs of association rules.

FIG. 13 is an example user interface screen presenting association rule classification results.

DETAILED DESCRIPTION

Example 1—Overview

Figure 1:
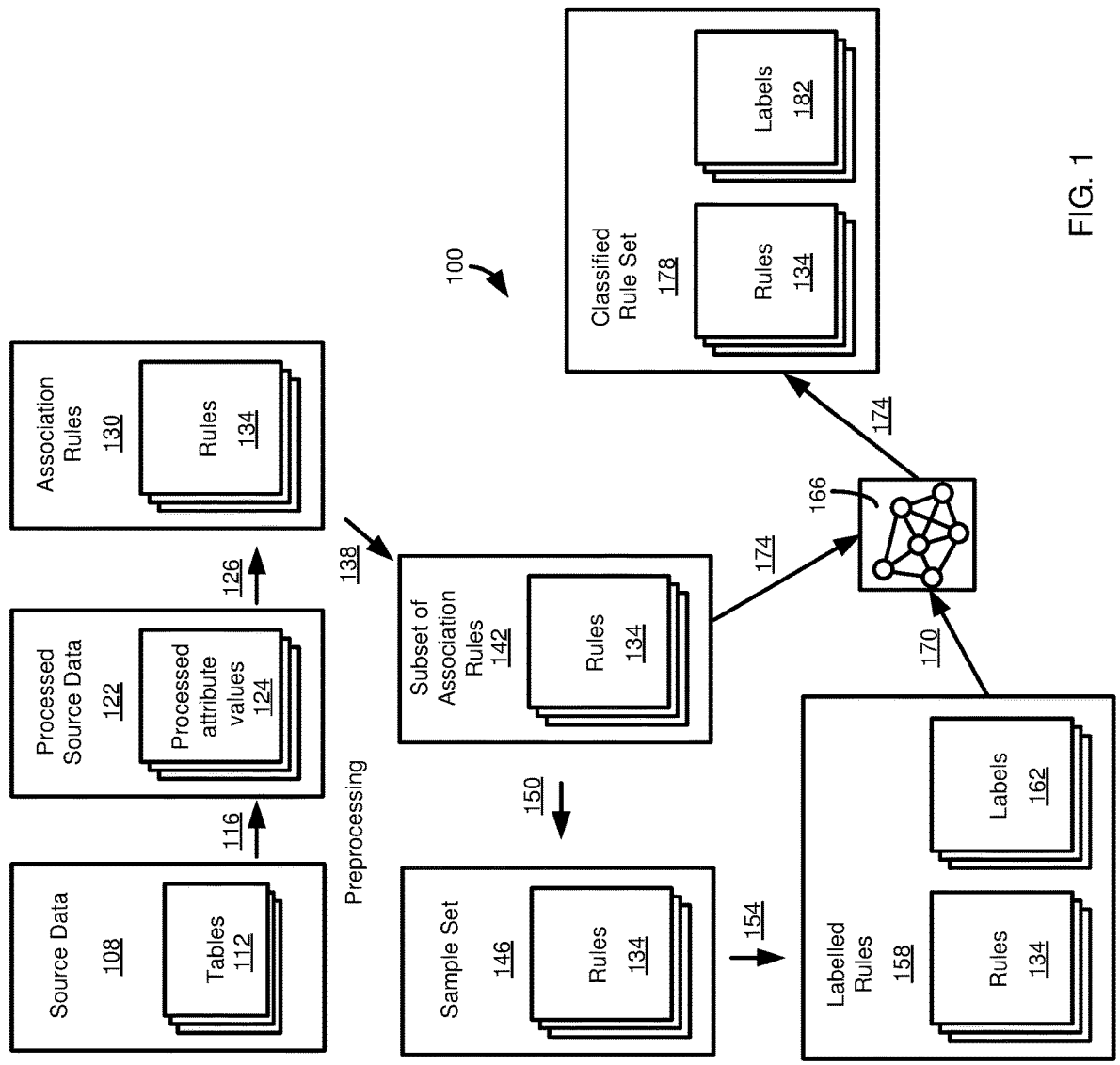
FIG. 1 is a schematic diagram illustrating a process for classifying relationships between data using a machine learning classifier trained using a sample set of the relationships annotated by a user.

As computers become more pervasive, opportunities exist for determining relationships between data that may be generated or acquired. For example, relationships between data, which can be expressed as rules, can be used to determine whether particular types of data are associated with each other. The presence of these rules can be used for a variety of purposes, including optimizing various processes, or to obtain insights that might be exploited in other ways.

For example, a user may analyze rules to determine that they provide an indication or test of data quality (e.g., the rules can be used to define validation checks), for predictive purposes, and to uncover relationships that may be used for a variety of purposes, including improving performance and efficiency. In a particular aspect, relationships between particular attributes, or attribute values, of one or more relational database tables can be used to optimize database operations, such as by partitioning data to optimize database operations, such as select and join operations (e.g., reducing a number of multi-node selects or joins, or determine optimized paths between relations) or simplifying database transaction management (e.g., by reducing a number of two-phase commit operations).

Problems can arise when analyzing large data sets, particularly in specialized fields. For example, if a large data set is analyzed, a large number of rules may be generated. Many of the rules may not provide useful information, and it can be time consuming to determine which rules are of interest and which are not. Further, determining whether a rule is useful often requires an expert with knowledge of complex or specialized subject matter.

The present disclosure provides technologies that can be used to facilitate manual or automated rule determination and analysis. In some aspects, disclosed technologies provide methods of preprocessing data to be analyzed to reduce the number of rules that are generated, which can also improve computing performance, as it can significantly reduce the amount of data that subsequently is processed. Further, this processing can provide such performance increase with little or no impact on the amount or quality of rules that are identified.

In further aspects, disclosed technologies facilitate automated rule analysis, such as analyzing rules using machine learning approaches to automatically extract or identify rules that are likely to be of interest. In some cases, a machine learning approach can include training data, where a user, such as a subject matter expert, manually labels a sample set of the rules. While this approach can be useful, it can lead to rules being miscategorized if the sample set is not appropriately chosen. For example, a random selection of rules can result in a sample set that is not sufficiently diverse. If the sample set is not diverse enough, the training data may not be as useful, as it may not contain sufficient information to provide a well-trained classifier. As a result, at least some of the results provided by the classifier may be inaccurate, in that the subject matter expert would have labelled the rule in a different manner than the classifier.

Accordingly, disclosed technologies can provide improved speed and accuracy in determining rules, such as association rules. The disclosed technologies can reduce computing and human resources by allowing a classifier to be more accurately trained using smaller, but more diverse, training data sets.

The disclosed technologies also provide user interfaces that can assist a user in carrying out data analysis, including selecting processing parameters, obtaining rule samples for training purposes, labelling rules, analyzing classification results, and providing feedback that can used to further increase classifier accuracy.

Example 2—Example Relationship Determination and Labelling

FIG. 1 is a block diagram illustrating a scenario 100 of how data can be preprocessed to reduce computing resource use in determining association rules, how determined rules can be sampled and labelled, and how the sampled rules can be used to train a machine learning algorithm to provide a trained classifier than can be used to analyze the remainder of the association rules, as well as rules that might be produced as a result of further rule extraction.

The scenario 100 includes source data 108. Source data 108 can include data in a database, such as tables 112 of a relational database system. In other aspects, the data can be maintained in another format. When maintained as tables 112, the source data 108 can include schema data, such as attribute names or types, or data related to particular instances of the schema, such as particular tuples or tuple elements. The table data 112 can also include combinations of tuple values and attributes that are analyzed to determine particular rules (e.g., a combination of a value and an identifier of an attribute with which the value is associated).

In at least some cases, rules are formed between antecedents (e.g., attribute values on the left hand side of the rule) and consequents (e.g., attribute values on the right hand side of the rule). A rule can be that one or more attributes having a value (or range or set of values) are associated with one or more attributes having a value (or a range or set of values). Typically, an attribute appears either as an antecedent or a consequent, but not both.

However, prior to rule determination or extraction, the source data 108 can undergo a preprocessing step (which can include one or more discrete operations) 116 to provide processed source data 122, which can include processed attribute values 124. The preprocessing 116 can include selecting certain attributes to be analyzed. For example, in a table that includes twenty attributes, it may be that ten attributes are most likely to yield useful rules, or yield useful rules for a specific purpose (and perhaps other attributes may be useful for a different specific purpose). If desired, other portions of a table, such as particular partitions, can be selected for analysis and other portions not included.

In some cases, user input can be used to determine which attributes (or other source data 108) to be included for analysis, and the preprocessing 116 can include receiving such user input and selecting the appropriate source data 108 for further analysis. In other cases, all or a portion of the source data 108 to be further processed can be selected automatically. For example, the source data 108 can be analyzed to determine whether certain data should or can be excluded from further analysis.

Redundant, or non-diverse, data is one type of data that can be analyzed and automatically excluded, or information about redundancy presented to a user so that the user can choose whether to include the data.

In a particular example, the preprocessing at 116 can include calculating the entropy of attribute values for particular source data 108. Entropy can be calculated as:

$$H(X) = \Sigma_{i=1}^{n} P(x_i)I(x_i) = \Sigma_{i=1}^{n} P(x_i)\log_b P(x_i) \quad (1)$$

where $P(x_i)$ is the probability of a particular value $x_i$ and b is the log base (e.g., 2, e, 10). The range of entropy values can be between 0 and 1, with 1 being maximum entropy (highest information diversity) and 0 being minimum entropy (lowest information diversity).

In some cases, threshold entropy values can be set, such that an attribute is not selected for analysis if it does not satisfy a threshold. In other cases, threshold values can be used to determine that columns having entropy values satisfying the threshold are always selected for analysis. In a particular example, a threshold can be selected, including dynamically, based on a particular data set. For example, a plot can be made of a number of columns having an entropy value above particular values (x-axis). In some cases, an inflection point (or a point where a pronounced change in slope or trend occurs) can be determined, where a number of columns having an entropy value above the value has a more pronounced difference than a number of columns having an entropy value below the value. This inflection point can be set as the entropy threshold. Thus, the entropy threshold can be set based on diversity differences in particular datasets. In other cases, a combination of approaches can be used, such as selecting all attributes having an entropy satisfying a threshold, not selecting attributes not satisfying another threshold, and using another technique, such as graphical analyze, to determine other attributes that will be selected for analysis.

Preprocessing at 116 can also include formatting data for use in rule determination. For example, association rule mining techniques typically cannot be directly applied to numerical values. So, columns having numerical values can be discretized into intervals. The number of intervals, and interval definitions, can be automatically selected or can be user-configurable. In some cases, intervals can be regular, and in other cases intervals can be irregular. For example, intervals can be defined that have meanings such as "low," "medium," and "high," and a number of values that are considered "high" may be different than a number of values that are considered "medium." The number of intervals can be fixed, or can be selected based on a number of discrete values in a column, or a measure of value diversity in a column.

One technique that can be used to discretize numerical values is k-means clustering. However other discretization techniques can be used, including x-means clustering, Equal-Frequency, or Equal-Width. K-means clustering can be advantageous in that the original contribution of numeric data can be retained, and the intervals are typically more meaningful. Or, as described, intervals can be manually assigned or evenly or regularly spaced intervals can be determined for a particular value range (such as between the minimum and maximum values for the attribute represented in the source data 108). In some cases, including for use in k-means clustering, an optimal value of k can be determined using the Elbow method, Akaike information criterion, Bayesian information criterion, Deviance information criterion, rate distortion theory, the silhouette method, or using cross-validation.

Preprocessing at 116 can further include grouping attributes by transaction (e.g., selecting relevant attributes from particular tuples) and compression or encoding techniques. For example, processing may be more efficient if attribute values, particularly long strings or character arrays, are replaced with an identifier that codes for a particular attribute with a particular value. For example, a value of "Name=WeiHan" may be replaced by "1" when it occurs, and "Name=MarcusAdam" may be replaced by "2" when it occurs. Correspondingly, a value of "Supervisor=WeiHan" may be replaced by "3" when it occurs, as that value involves a different attribute than "1," even though the attribute value is the same.

Association rule determination, or mining, is carried out at 126 on the processed source data 122. Any suitable association rule mining technique can be used, including the APRIORI algorithm. Other suitable techniques include ECLAT, FP-growth, AprioriDP, Context Based Association Rule Mining, Node-set-based algorithms (such as FIN, PrePost, and PPV), GUHA (including ASSOC), and OPUS. Other types of rule mining may also be used, including multi-relation association rule mining, context based association rule mining, contrast set learning, weighted class learning, high-order pattern disclosure, K-optimal pattern discovery, approximate frequency itemset mining, generalized association rule mining, quantitative association rule mining, interval data association rule mining, sequential pattern mining, subspace clustering, and Warmr data mining.

The association rule determination 126 produces an initial association rule set 130, which includes a plurality of association rules 134. The plurality of association rules 134 can include redundant rules. A rule can be classified as redundant if it can be generated by adding additional items to another rule. Non-redundant rules can be those rules that are the most general, having equal confidence. For example, a rule R1 of B+D→A+C is redundant to a rule R2 of B+D→A. Similarly, a rule R3 of C+B+D→A is redundant to R2 (all the confidence of R1, R2 and R3 is 1.0). In some cases, a rule is marked as redundant only if its confidence is the same as, or less than, a more general rule.

Redundant rules can be removed from the initial association rule set 130 in a process 138 to produce a rule subset 142 typically having a reduced number of rules 134 (that is, there may be some circumstances when the association rules 130 did not include redundant rules). In particular examples, and depending on how attributes were selected (e.g., how many potentially redundant or low-diversity columns were removed prior to rule mining), removing redundant rules can reduce the number of rules by a quarter, a third, a half, 90%, or more.

The rule subset 142 typically contains rules 134 that are desired to be classified, such as of being of potential interest to a user. As has been described, it can be difficult for a user to manually evaluate every rule 134 in the subset 142. For example, a subset 142 may include hundreds or thousands of rules 134. Accordingly, a sample set 146 of rules 134 can be extracted from the subset 142 in a sampling process 150. The sampling process 150 can include random sampling methods, methods to obtain representative rules, methods to select diverse rules (including the most diverse rules 134), or a combination thereof. The selected rules can be manually evaluated for use as training data for a machine learning algorithm.

In particular aspects, the sampling process 150 can include determining differences between rules, and using those differences in extracting samples. Suitable sampling techniques will be further described in Example 5. Briefly, differences between rules can be expressed as the Jaccard distance. The Jaccard distances can be used in techniques such as clustering-based sampling (including agglomerative hierarchy clustering or K-Medoid Clustering) or Convex-Hull sampling to retrieve rules 134 from the subset 142. However, in other aspects, another distance determination technique can be used to measure similarity or dissimilarity between rules, or similarity or dissimilarity can otherwise be evaluated in another manner.

The rules 134 in the sample set 146 can be labelled in a process 154 to provide a labelled ruleset 158 of rules 134 and their associated labels 162. The process 154 can include a user interface that presents a user, such as a subject matter expert, with the rules 134 in the sample set 146 and allows that user to tag each rule with an identifier representing the interestingness, usefulness, or other criteria of interest for the rule. For example, the rules 134 may be tagged using a numerical scale (e.g., between 1 and 3, and 1 and 5, or 1 and 10, based on level of interestingness or criteria satisfaction), or can be tagged using semantic identifiers (such as "high," "medium," and "low").

As the sample set 146 is used for training a machine learning algorithm to serve as a classifier, the labels applied during the labelling process 154 are typically the labels which are desired for the classifier to assign to other rules of the rule subset 142 (or future rules to be evaluated). In some cases, a rule is "interesting" if it is unexpected, such as being unknown to someone in the field, or contradicting their expectations, or if there is some action that can be taken as a result of the rule that improves quality, efficiency, performance, or some other metric of interest.

The rules 134 and labels 162 of the labelled rules 158 are used to train a machine learning algorithm 166 in a training process 170. In a classification process 174, the machine learning algorithm 166 serves as a classifier that evaluates the rules 134 in the subset 142. The classification process 174 can produce a classified set 178 of rules 134 and associated labels 182. The rules 134 and labels 182 can be presented to a user.

Any suitable machine learning technique 166 can be used to generate a classifier. Suitable techniques include classification and regression techniques, including ensemble learning methods and decision trees. One particularly suitable class of techniques is random subspace methods, such as random forests or random decision forests. Details regarding a suitable random forest technique can be found in Brieman, L., "Random Forests," *Machine Learning* 45(1): 5-32 (October 2001), incorporated by reference herein in its entirety.

In some cases, labels applied to rules may be skewed, in that there may be, for example, a larger number of uninteresting rules than interesting rules. Classifier training can account for these differences to help ensure that "interesting" rules are not labelled as "uninteresting" merely to maintain a distribution that was present in the training data. Training data can thus be weighed, such as in a weighted random forests techniques, to help reduce such skew, and to place more "importance" on "interesting" rules. In a particular example, a weighting of 7:3 of "interesting" to "uninteresting" is used. In addition to increased accuracy, weighting of training data can provide improved F-1 measure, precision, and recall. In other cases, accuracy can be reduced using weighting, but other classifier performance metrics can be improved.

Example 3—Example Data Preprocessing

As discussed in Example 2, data can be preprocessed prior to being analyzed for association rules. FIG. 2 presents a table 200 that includes records 204 having a plurality of attributes 208. The attributes 208 can include a record ID 208a, which can uniquely identify a record. The record ID 208a can correspond to a primary key value or a transaction identifier. The other attributes 208b-208d can be of various types (e.g., data types) and can be manually selected by a user, automatically selected (such as based on column data value diversity or other criteria), or a combination thereof (e.g., a set of attributes 208 can be suggested and a user can add attributes to, or remove attributes from, the set).

In some cases, the attributes 208 can represent all of the attributes in source data, while in other cases the attributes 208 can be a subset of source data. Typically, the attributes 208 are selected from a single source data source, such as a single table. However, if desired, the table 200 can be formed from data located in different sources, including different tables.

The table 200 can be used to generate a mapping table 300, shown in FIG. 3. The mapping table 300 assigns an identifier 304, Item ID, to each attribute value 308. This procedure can simplify later processing, as it can be less resource intensive for a computer to process integer values as opposed to string values, character arrays, algebraic expressions, and the like. The table 300 thus represents all possible attribute values in the table 200 (or, at least values of those records 204 or attributes 208 selected for further analyses). The mapping table 300 can be used to correlate rule elements to attributes 208 and attribute values 308. For example, referring to table 300, if a rule is identified having an identifier 304 of "2," it can be determined that the attribute 208 is "group" and the value 308 is "1A."

The mapping table 300 can be used to construct a transaction table 400, shown in FIG. 4. The transaction table 400 includes identifiers 404 for particular transactions (e.g., records or tuples) and item identifiers 408 associated with the transaction identifiers 404. The transaction table 400 thus serves as an encoded version of the table 200, where the attribute values 212 of FIG. 2 are replaced by the corresponding identifiers 304.

Note that the above discussion implies that the identity of a particular attribute need not be known in order for the disclosed association rule mining techniques to be applied. That is, attributes can be encrypted or encoded and rules generated. The generated rules can be decrypted or decoded and labelled by a user. The labelled sample set can be re-encoded or re-encrypted and used to train a classifier, which can operate on encoded or encrypted rules. The labelled rules can then be decrypted or decoded and displayed to a user for analysis.

Example 4—Example Redundant Rule Removal

As mentioned in Examples 1 and 2, association rule mining can provide a large number of rules, including rules that are redundant. Redundancy can result from rules that are verbatim duplicates, as well as rules that are subsumed or implied by other rules. Redundant rules can be identified and eliminated using various techniques, including statistical methods.

One suitable technique for removing redundant rules involves rule clustering, where an "association identifier" can be used to represent all the rules in a particular cluster. Suitable techniques include the technique is described in Strehl, et al., "Distance Based Clustering of Association Rules," *Proceedings ANNIE* 9 pp. 759-764 (1999), incorporated by reference herein in its entirety. In a particular example, an association identifier can be used to represent the set of rules where the Jaccard distance (defined in Example 5, below) between the rules is zero (briefly, because the union and intersection of the rules are equal).

The clustering method can be similar to determining functional dependencies between attributes, where more complex dependencies can be formed from other dependencies. An example of how multiple association rules can be related by an association identifier is presented in FIG. 5. A plurality of association rules 504 can be represented by the association identifier 508. Or, stated another way, all of the association rules 504 are implied by, or can be derived from, the association identifier 508. As the rules 504 are related, it is typically not necessary that each individual rule be analyzed (either through manual labelling or through classification using a machine learning approach). In another aspect, redundant rules can be removed by forming a set of closed frequent itemsets, as discussed in Zaki, "Generating Non-Redundant Association Rules," *Proceedings of the sixth ACM SIGKDD international conference on Knowledge discovery and data mining*, 34-43 (2000), incorporated by reference herein in its entirety.

As mentioned above, in some cases rules are not considered redundant unless they have a particular relation between their confidences, such as having equal confidence.

Example 5—Example Rule Sampling

As described in Examples 1 and 2, sampling can be carried out using a variety of techniques, including techniques that select random samples or which select samples according to a non-random criteria, such as selecting samples which are representative of particular rules or groups of rules, or which may be diverse, including rules that are outliers. The performance of a classifier can vary depending on how it is trained. It at least some cases, improved classification can be obtained by having a user train a sample rule set of diverse rules.

In some cases, a sampling method can use a binary vector matrix of attribute values, such as illustrated in FIG. 6. A matrix 608 is formed from a plurality of binary vectors 612. Each vector 612 can represent an association rule, and each element 616 of the vector can represent a particular attribute value. That is, each index position of a vector 612 can correspond to a particular attribute value, and the presence or absence of the attribute value in the vector can be indicated by setting the value of the element to 1 (if the attribute value is part of the rule) or to 0 (if the attribute value is not part of the rule). So, for example, vector 612a can represent an association rule (or association rule identifier) of {A}→{B,C}, with elements corresponding to A, B, and C set to 1 and all other elements set to 0. Vector 612b can represent an association rule such as {A,D}→{C,E}.

The compositions of the rules, as expressed by the vectors 612, can be used to construct a distance vector matrix, as illustrated in FIG. 7. The distance can be the Jaccard distance, where the distance is calculated as:

$$d_J(A, B) = 1 - J(A, B) = \frac{|A \cup B| - |A \cap B|}{|A \cup B|}$$

where d is the Jaccard distance and A and B are the rules being compared. So, for example, comparing the rules {A}→{B,C} and {A,B}→{B,D,E} would provide a union of {A,B,C,D,E} and an intersection of {A,B}. As there are 5 elements in the union and 2 elements in the intersection, the Jaccard distance of these two rules is (5−2)/5=0.6. The more dissimilar the rules, the greater the distance between them, and the larger the Jaccard distance.

FIG. 7 illustrates an example Jaccard distance matrix 700. It can be seen that each row 704 and each column 708 of the matrix 700 correspond to a rule. Thus, the distance between rows and columns having the same index is 0, as a given rule is identical to itself. This distance matrix 700 can then be used in selecting a sample set, such as using techniques such as clustering-based sampling (including hierarchical agglomerative clustering or K-Medoids clustering) or Convex-Hull sampling.

Applying hierarchical agglomerative clustering to the distance matrix 700 provides a number of clusters, where the number of clusters can be selected to provide the number of samples desired. For example, if it is desired to have a user manually label 100 rules, the hierarchical agglomerative clustering technique can be configured to generate 100 clusters. In other aspects, fewer clusters can be formed than a number of rules to be selected.

In one aspect, the actual sample rules can be selected by determining the medoid of each cluster and selecting that rule as the rule to be included in the sample set. A medoid can be the data point within a cluster having the smallest average dissimilarity to other data points in the cluster. In other cases, the number of clusters can be less than a number of samples, and multiple rules can be selected from each cluster, typically the medoids and rules closest to the medoids.

Figure 8:
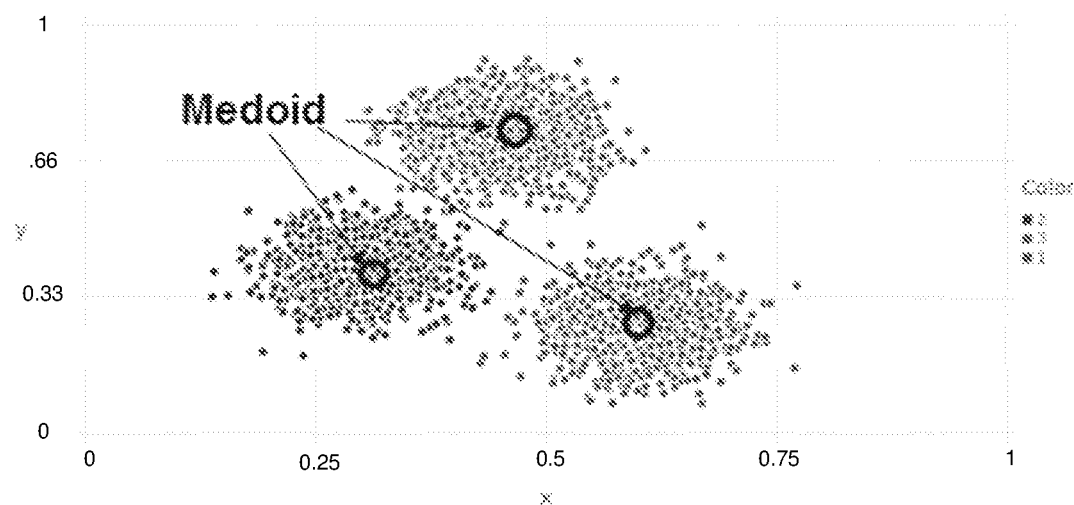
FIG. 8 is a graph of association rules by distance, illustrating how association rules can be clustered.

FIG. 8 illustrates example rule clustering and medoid selection. This technique tends to select the most representative rules in the rule set (again, typically the set of non-redundant rules determined using association rule mining) for the sample set.

In some aspects, it may be desirable to instead select a most diverse rule set, which can be accomplished using Convex-Hull sampling. The Convex-Hull sampling technique can also use the distance vector matrix 700. Multidimensional scaling is applied to the distance matrix 700 to convert the rules to a set of points having (x,y) coordinates. A Graham-Scan technique is applied to determine the Convex-Hull curve for the points. Finally, points can be selected along the curve to provide the sample set. In some cases, the Convex-Hull curve may include fewer points than are desired for the data set. In such cases, points can be selected inside the curve, but which are closest to the curve, such as having a maximal Jaccard distance sum between the points.

Figure 9:
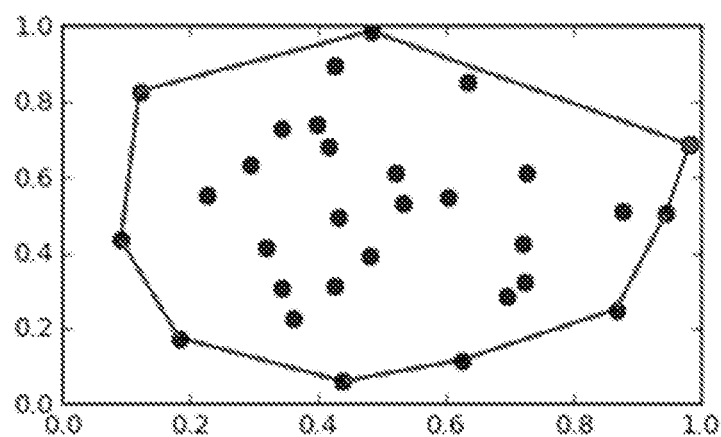
FIG. 9 is a graph of association rules by distance, illustrating how a Convex-Hull analysis can be used to select a diverse sample of association rules from a set of association rules.

An example Convex-Hull curve is presented in FIG. 9. Example operations in carrying out a Convex-Hull sampling method for a set of rules R to provide a rule set of size M can be:

Input:
  Rule set: R={$R_1, R_2 \ldots R_N$}
  Sample size: M rules
  Points along Convex-Hull curve: P={$P_1, P_2 \ldots P_M$}
Output: sample set S={$S_1, S_2, \ldots S_M$}
Procedure:
1. Determine distance matrix D (N×N): calculate the Jaccard distance between $R_i$ and $R_j$, $\forall R_i$ and $R_j \in R$
2. Determine the set of N points in two dimensional space (x,y): multidimensional scaling of D
3. Determine the set of points in the Convex-Hull: Graham-Scan algorithm to calculate the Convex-Hull curve for N points; find out P points along the Convex-Hull curve
4. IF (|P|≥M):
  Calculate the Jaccard distance between each pair of rules in P
  Determine M points in P, where the sum $\Sigma d(P_i P_j)$ of M points is maximum
5. IF (|P|<M):
N': points inside the Convex-Hull (N-P)
while (|P|<M):
  search for the point n∈N' if the sum:
$\Sigma_j d(n, p_j), \forall p_j \in P$ is maximum.
  P=P∪{n},N'=N'-{n}

If desired, a sample set can be constructed using a plurality of sampling techniques. For example, a sample set can be constructed using a combination of rules selected using two or more of random sampling, hierarchical agglomerative clustering sampling, and Convex-Hull sampling. In a particular example, a combination of clustering-based sampling and Convex-Hull sampling can be used. Combining sampling methodologies can help ensure that a user labels training data that is representative of similar data items (e.g., items that are in the interior of a cluster), and dissimilar data items (e.g., items that are on the exterior of a cluster).

Although the Convex-Hull sampling technique described above, and other aspects of data preprocessing, such as redundancy removal and formatting table data for association rule mining, is generally described with respect to association rule mining and labelling, it should be appreciated that such novel techniques can be applied in other areas. For example, the Convex-Hull technique described above can be used in other scenarios where it is desired to obtain a sample of attribute relationships, using distances between attribute relationships.

Example 6—Example User Interface Screens

FIGS. 10-15 present example user interface screens according to an example embodiment of the disclosed technologies. The example user interface screens can guide a user through aspects of selecting data to be analyzed, configuring processing options, selecting a sample rule set, labelling the sample rule set, and viewing and interpreting classification results. The user interface screens can work in conjunction with implementing technologies described in Examples 1-5.

Figure 10:
FIG. 10 is an example user interface screen allowing a user to select attributes to be analyzed for relationships.

FIG. 10 illustrates an example user interface screen 1000 that can allow a user to configure data to be analyzed for association rules. The screen 1000 can allow a user to select particular attributes 1010 to be included in an analysis. Each attribute 1010 can include a user interface element 1014, such as a check box or radio button, which can be selected or deselected by a user. The screen 1000 can include a user interface element 1018 that a user can select or deselect to "select all" attributes and a user interface element 1022 that a user can select or deselect to "deselect all" attributes.

The user interface screen 1000 can include a navigation bar 1026 that can allow a user to navigate to different user interface screens of FIGS. 10-14. The user interface screen 1000 can be selected using a "Data Pre-Processing" user interface element 1030. A user interface screen 1100 for configuring attributing mining parameters, shown in FIG. 11, can be selected using a user interface element 1034. A screen 1200 for rating a sample set, shown in FIG. 12, can be selected using user interface element 1038. A classification results screen 1300, shown in FIG. 13, can be selected using user interface element 1042.

In some aspects, the attributes 1010 presented on the screen 1000 can be all of the attributes from all of the tables, or other data sources, which are to be analyzed to determine relationships or rules. In other aspects, the attributes 1010 can be filtered prior to being presented to a user. For example, the attributes 1010 can be analyzed for redundant information, and only attributes satisfying a threshold are presented on the screen 1000. Or, redundancy, such as measured by entropy, can be measured and the attributes 1010 displayed to a user with an indicator of entropy or redundancy, such as highlighting attributes in colors based on redundancy information or displaying icons conveying redundancy information.

In some aspects, the attributes 1010 selected on the screen 1000 are mined for association rules, regardless of other criteria, such as how redundant the data is. In other cases, attributes 1010 selected by a user can be analyzed after selection and omitted from further analysis if a threshold redundancy factor is not satisfied. Further, some attributes 1010 can be identified by a data analysis tool as being mandatory for analysis or mandatory for non-analysis. In yet further examples, relationships can be established between attributes 1010 such that the selection of one or more attributes requires or suggests the selection of one or more additional attributes, or that the selection of one or more attributes requires or suggests the elimination of one or more additional attributes. In yet further embodiments, the screen 1000 can be skipped or omitted, and an analysis can proceed with a default set of attributes 1010, would could be all attributes.

Figure 11:
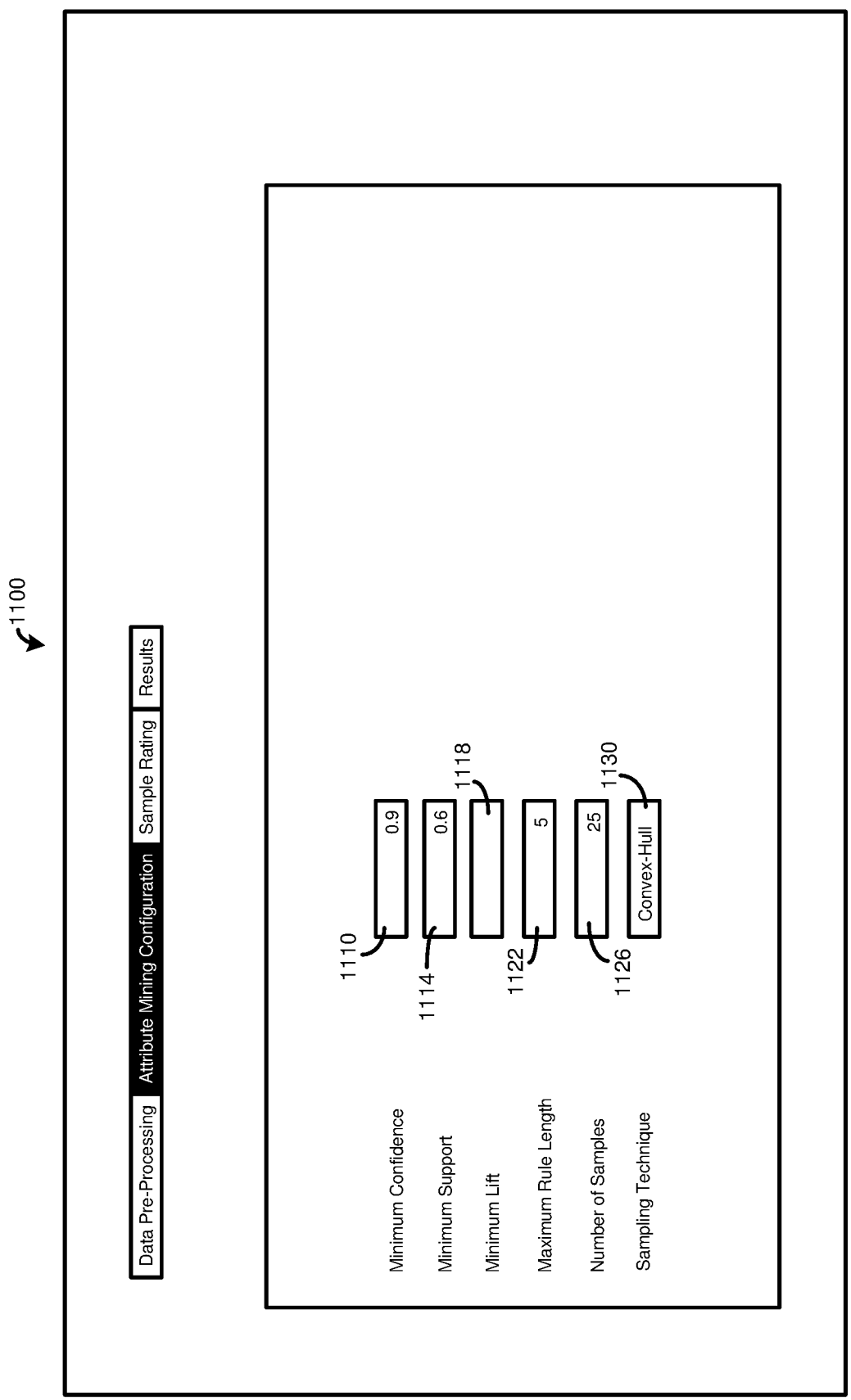
FIG. 11 is an example user interface screen allowing a user to configure association rule mining and sampling parameters.

FIG. 11 illustrates the user interface screen 1100 which can allow a user to define filtering criteria and other association rule mining or data processing parameters. For example, the screen 1100 can provide a user interface element 1110 allowing a user to set a minimum confidence value, a user interface element 1114 allowing a user to set a minimum support value, and a user interface element 1118 allowing a user to set a minimum lift value. In some cases, one or more of the user interface elements 1110, 1114, 1118 can be omitted, or the processing can proceed with no minimum value, or can apply default minimum values, if user-defined values are not provided.

A user interface element 1122 can allow a user to select a maximum rule length, where rule length includes both antecedent and consequent elements. In other aspects, a user may be allowed to select specific values for a maximum number of antecedent elements and a maximum number of consequent elements. In some cases, a data analysis can proceed without a maximum rule length being selected, which can include not applying a maximum length, or applying a default maximum rule length, a default maximum antecedent length, a default maximum consequent length, or a combination thereof.

A user interface element 1126 can allow a user to select the number of sample rules to be extracted for labelling. In some cases, a data analysis tool can require or suggest a minimum or maximum number of sample rules, or can processed using a default number of sample rules. A user interface element 1130 can allow a user to select a sampling technique, such as selecting representative samples, diverse samples, or a combination of different sample types. The user interface element 1130 can similarly allow a user to select a specific sampling methodology, such as selecting random sampling, clustering-based sampling (such as hierarchical agglomerative clustering), or Convex-Hull sampling.

Figure 12:
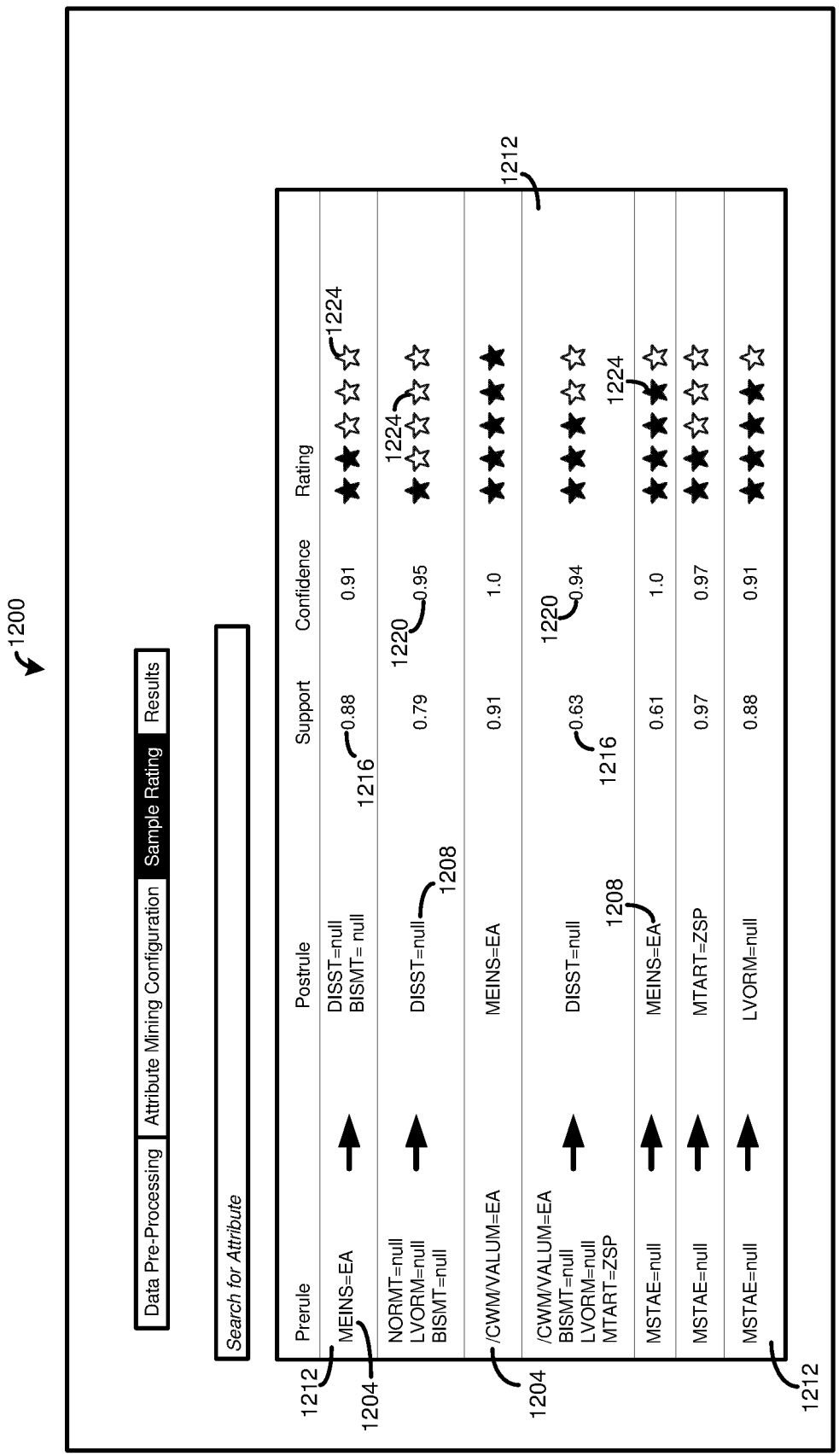
FIG. 12 is an example user interface screen allowing a user to label a sample of association rules.

FIG. 12 illustrates the user interface screen 1200, which can allow a user to label sample rules. The screen 1200 can display prerule information 1204, attribute values that are rule antecedents, and postrule information 1208, attribute values that are rule consequents, for each of a plurality of rules 1212. Addition information regarding the rules 1212 can be displayed, including support values 1216 and confidence values 1220.

The screen 1200 can display user-selectable interface elements 1224 by which a user can label the rules 1212. As has been described, the ratings supplied by the user are typically the ratings which will be applied by a classifier to other rules in a data set. Ratings can be specified using any desired numerical or sematic label, and can be defined at various granularities. For example, the screen 1200 allows a user to select a number of stars 1224, where a high number of stars indicates a high interest item and a low number (including zero) stars indicates a low interest item. Of course, rather than "interest," the labels 1224 can represent how well a rule complies with some other criteria. Although 6 rating levels are shown, a larger or smaller number of levels could be provided, such as 3 (high, medium, or low), a scale of 1-10, or some other number of levels.

In some cases, such as if a classifier is being retrained or evaluated, the initially displayed rating information provided by the interface elements 1224 can be a current rating provided by a classifier. A user can adjust this rating in order to refine/retrain the classifier.

FIG. 13 illustrates the screen 1300, which allows a user to view rating information 1304 provided by a classifier. That is, user input received via the user interface screen 1200 can be used to train (or retrain) the classifier. After the classifier has been trained, it can analyze the remainder of the data set (e.g. the rules determined using the attributes 1010 selected in the screen 1000 of FIG. 10).

The screen 1300 can include prerule information 1312, postrule information 1316, support information 1320, confidence information 1324, and rating information 1328, for a plurality of rules 1332, which information can be implemented at least generally as described for the corresponding features of FIG. 12. In at least some cases, the rating information 1328 can be altered by a user and used to retrain the classifier, in an analogous manner as described with respect to FIG. 12.

It should be noted that the rules 1212 and the rules 1332 can exclude certain rules at least initially identified by association rule mining. For example, as described, redundant rules can be identified and removed prior to displaying the rules 1212 and 1332. That is, the rules 1212, 1332 can be selected from a set of non-redundant rules.

Figure 14:
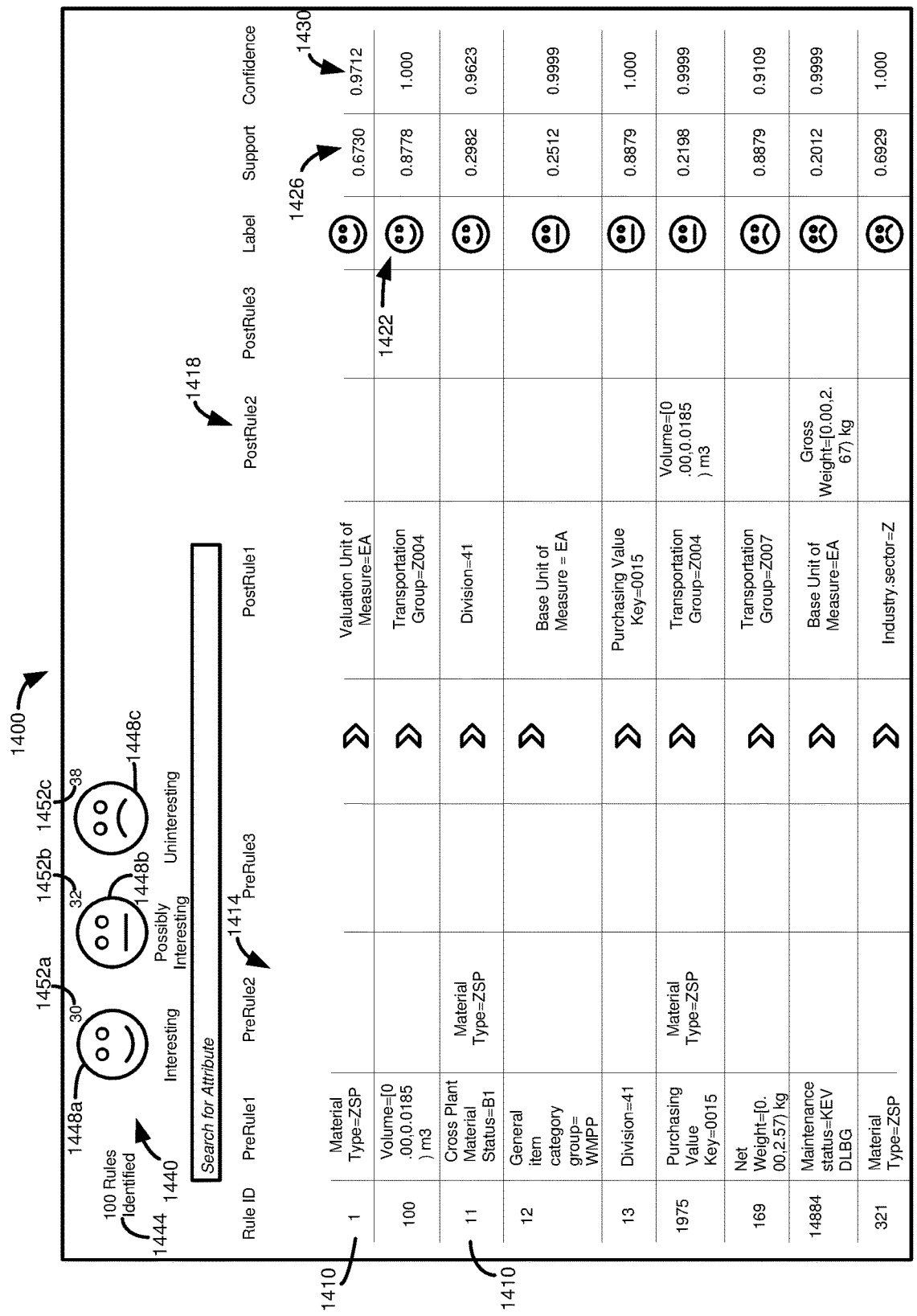
FIG. 14 is an example user interface screen summarizing classified association rules.

FIG. 14 illustrates a rule summary screen 1400. The rule summary screen 1400 can include at least some information that is similar to information presented in the screen 1300. However, for each rule 1410, the screen 1400 presents individual attribute values for antecedent elements 1414 and consequent elements 1418. As with the screen 1300, the screen 1400 can include rating information 1422, support information 1426, and confidence information 1430.

The screen 1400 can further include a rule summary section 1440. The rule summary section 1440 can include an indicator 1444 providing a total number of rules identified, indicators for various rule labels 1448a, 1448b, 1448c and identifiers 1452a, 1452b, 1452c representing a number of rules 1410 meeting each rating label 1448. In some cases, a user may sort the rules 1410, or select rules to be displayed, by selecting an appropriate rating label 1448.

Figure 15:
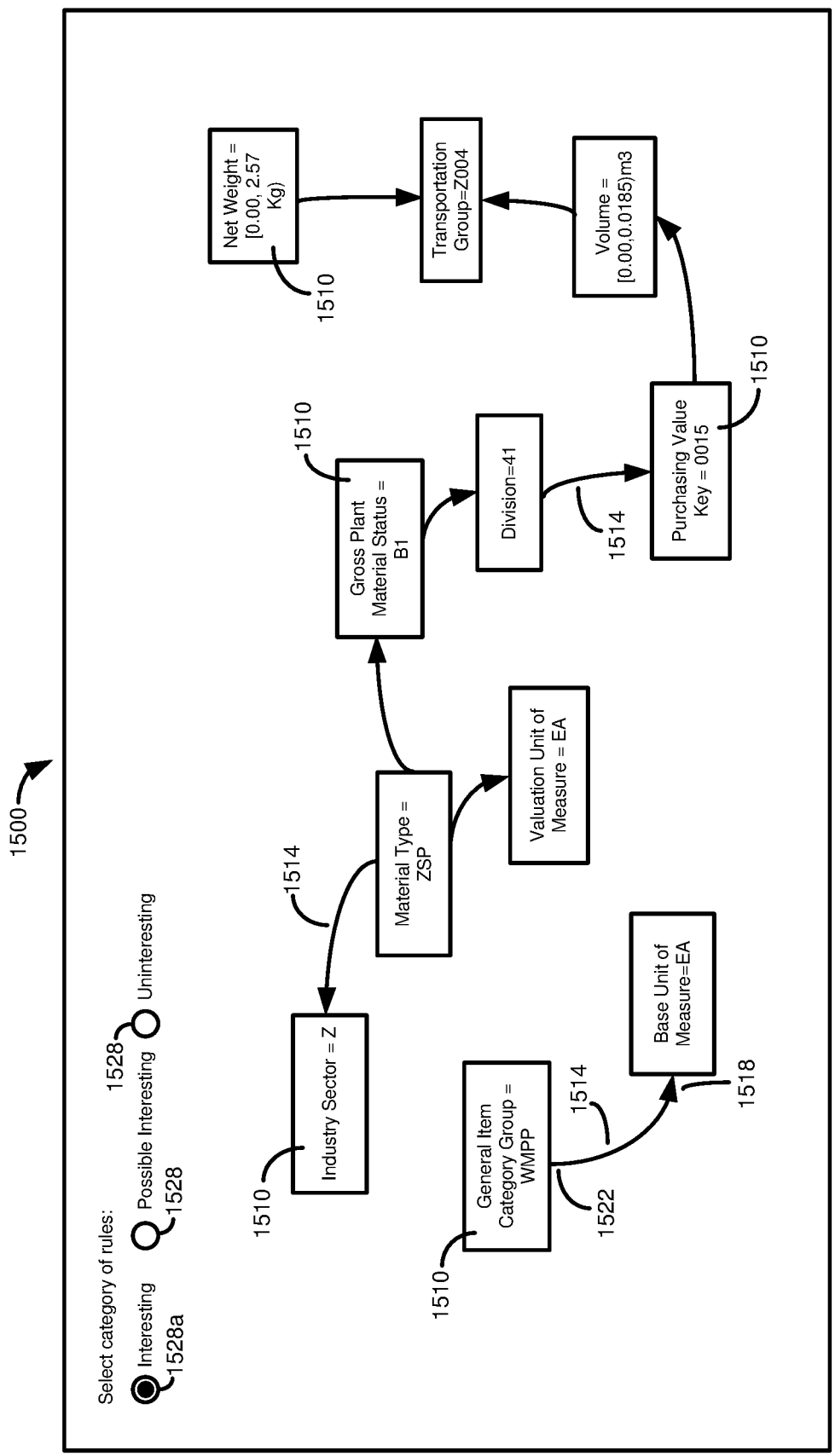
FIG. 15 is an example user interface screen presenting a visualization of relationships between attributes as determined by a machine learning classifier.

A data analysis tool can depict rules, and relationships between rules and rule elements, in other manners. For example, FIG. 15 provides a user interface screen 1500 that depicts how rules can be defined between attribute values 1510. Each attribute value 1510 can include an arrow 1514 linking it to other attribute values in the rule. The arrowheads 1518 can indicate whether an attribute value 1510 is an antecedent or consequent in that rule. That is, the arrowhead 1518 of an arrow 1514 can point to a consequent attribute value and the tail 1522 of the arrow can be placed proximate the antecedent attribute value.

If desired, the arrows 1514 can be visually distinguished to help identify specific rules. For example, the arrows 1514 can have different colors, widths, or character (e.g., dashed, not dashed, type of dashing), where common visual characteristics indicate relationships for a common rule.

A user can be presented with user interface elements 1528 that can allow a user to select particular categories of rules to be viewed, such as rules having particular label types. For example, a user may choose to display on rules labelled as "interesting" by selecting user interface element 1528a.

Figure 16:
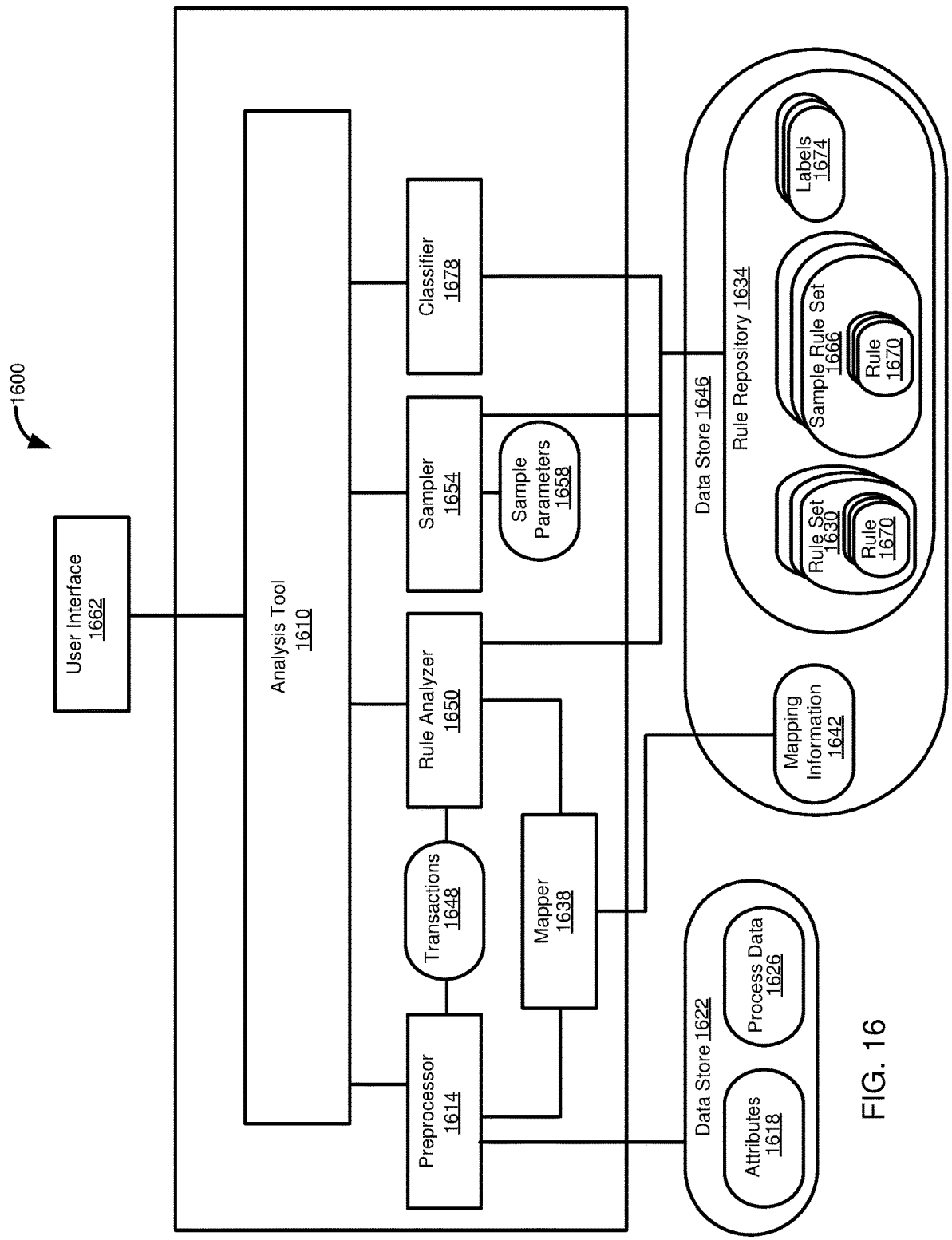
FIG. 16 is an example computing environment in which disclosed technologies can be implemented.

Example 7—Example Computing Environment for Relationship Determination and Classification FIG. 16 illustrates a computing environment 1600 in which disclosed technologies can be implemented. The environment 1600 includes an analysis engine or tool 1610. The analysis engine 1610 can call and coordinate various components of the environment 1600 to carry out all or a portion of a data analysis.

For example, the analysis engine 1610 can call a preprocessor 1614. The preprocessor 1614 can execute operations in preparing source data, such as in the form of attributes 1618, or fields, for analysis. As described in Examples 1-4 and 6, the processor 1614 can include operations such as identifying and removing columns that are redundant/low diversity, discretizing numerical values, forming mapping tables for compression purposes, and formatting records or transactions into constituent attribute values (such as record/transaction ID/attribute value pairs).

The attributes 1618 can be stored in a data store 1622, which can also store process data 1626. Process data 1626 can include data defining a particular data analysis, including attributes analyzed, process configuration data (e.g., minimum support and confidence values, sample set size, sampling method, and the like). The process data 1626 can also identify users associated with a particular process and identify a rule set 1630 of a rule repository 1634 that is associated with a particular process.

In carrying out preprocessing, the preprocessor 1614 can call other components, such as a mapper 1638. The mapper 1638 can map attribute values to attribute identifiers, and can store and retrieve mapping information 1642, such as to and from a data store 1646 (which can also contain the rule repository 1634, and can be the same as the data store 1622, in some aspects). Storing the mapping information 1642 can be useful, for example, in converted encoded rules into the original attribute values so that a user can label sample rules or evaluate classification results.

As has been described, the preprocessor 1614 can generate transactions 1648, where a transaction can include a list of transaction or record identifiers and mapped/encoded attribute values. The transactions 1648 can be accessed by a rule analyzer 1650. The rule analyzer 1650 can apply a rule or relationship mining technique to the transactions 1648 to generate rules that can be stored in the rule repository 1634. The rule analyzer 1650 can carry out other functions, such as removing redundant rules from a rule set. In other examples, redundant rule removal is carried out by another component.

The rule sets 1630 of the rule repository 1634 can be accessed by a sampler 1654. The sampler 1654 can select rules from a rule set 1630 to be labelled by a user. The particular sampling technique, and processing parameters, can be stored in the process data 1626. The sampler 1654 can generate sample parameters 1658 for rules in the sample set, such as Jaccard distances from other rules. The sample parameters 1658 can also include labels applied by a user.

The sampler 1654, including through the analysis engine 1610, can communicate with a user interface 1662. The user interface 1662 can display rules from the sample rule set to a user, receive user input assigning labels or classifications to rules, which labels or classifications can then be stored as sample parameters 1658. The labels or classifications can also be associated with the rules of appropriate rule sets 1630 in the rule repository 1634.

The rule repository 1634 can include rule sets 1630 and sample rule sets 1666. Each rule 1670 in a rule set 1634 or a sample rule set 1666 can be associated with a label or classification 1674. The sample rule sets 1666 can be read by a classifier 1678 in order to train the classifier.

The trained classifier 1678 can then classify rules 1670 of a rule set 1630. In some cases, a computing environment 1600 can include multiple classifiers 1678. For example, when different source data is used for extracting attributes 1618, when different labels are applied, different sampling techniques are used, etc., it may be useful to generate different classifiers 1678 to improve classifier accuracy. For example, a classifier 1678 trained using attributes A-Z may not be suitable for classifying attributes 1-26.

The user interface 1662 can be in communication with the analysis engine 1610 to carry out various functions. For example, the user interface 1662 can generate, or display, one or more of the screens 1000-1500 of FIGS. 10-15. The user interface 1662 can more generally serve to allow a user to specify source data, processing parameters, label sample sets, and review classification results.

Example 8—Example Architecture for Interfacing Computing Platform and Database

Figure 17:
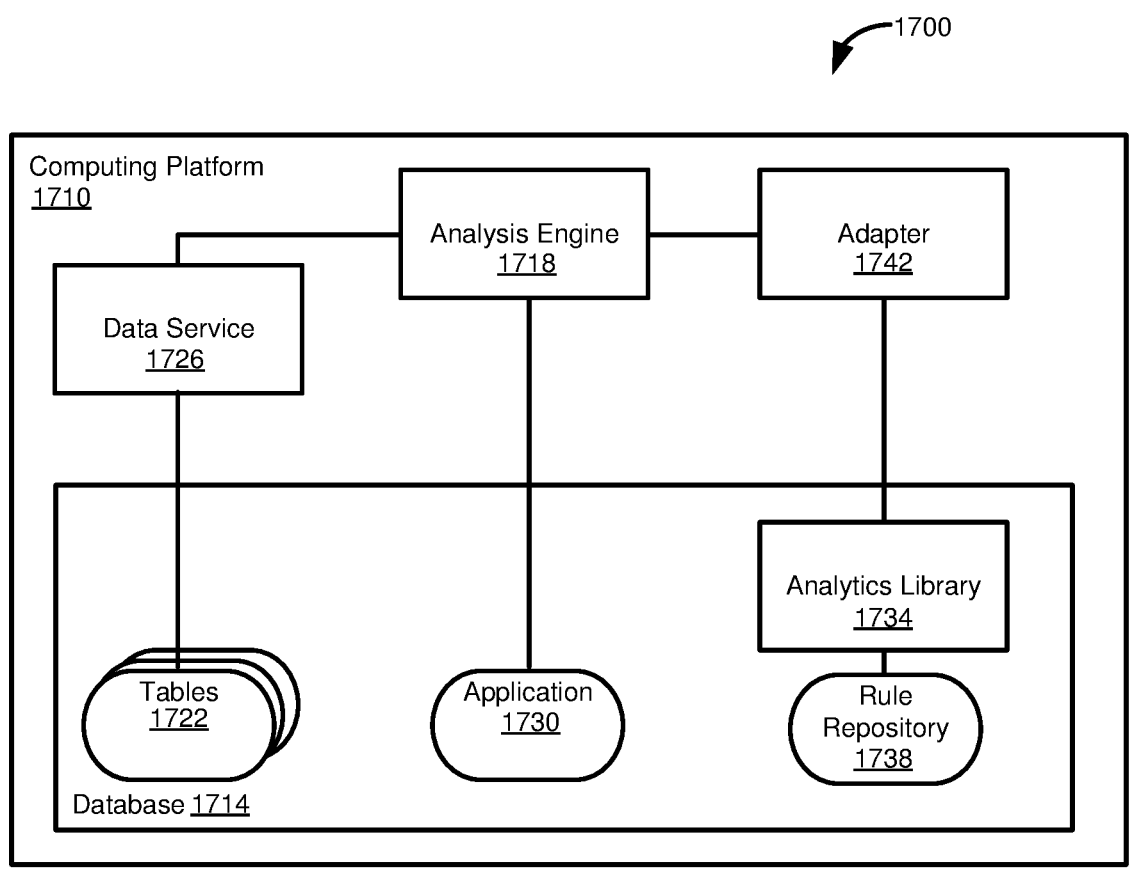
FIG. 17 is an example computing environment illustrating how an analysis engine can communicate with a database environment using a data service and an adapter.

FIG. 17 illustrates a computing architecture 1700 that can be used to facilitate implementation of disclosed technologies in particular computing environments, including the HANA and S/4 HANA environments of SAP, SE, of Walldorf, Germany. The architecture can include a computing platform 1710 that can include, or can access, a database 1714. The computing platform 1710 can include an analysis engine 1718, which can include at least certain functionality of the analysis engine 1610 of FIG. 16. The analysis engine 1718 can access tables 1722 of the database 1714 using a data service 1726. The data service 1726 can be the CDS VIEWS functionality of the HANA and S/4 HANA environments.

The analysis engine 1718 can access application settings 1730. The application settings 1730 can define an analysis process, including in a similar manner as the process data 1626 of FIG. 16. The analysis engine 1718 can access an analytics library 1734, which can include algorithms for clustering, sampling, and machine learning techniques, including for use in generating a classifier based on a random forests approach. The analytics library 1734 can access a rule repository 1738, which can store rules for use in sampling, classification results, labels, and optionally other information.

Communication between the analysis engine 1718 and the analytics library 1734 can be facilitated by an adapter 1742. The adapter 1742 can access features of the rule repository 1738 and the analytics library 1734 via APIs. The adapter 1742 can use various frameworks, including the ABAP DATABASE CONNECTIVITY and ABAP DATABASE PROCEDURES frameworks available from SAP SE, of Walldorf, Germany. However, an adapter 1742 for accessing an analytics library 1734 can be implemented in another manner.

Example 9—Example Methods of Training and Using Classifier

Figure 18:
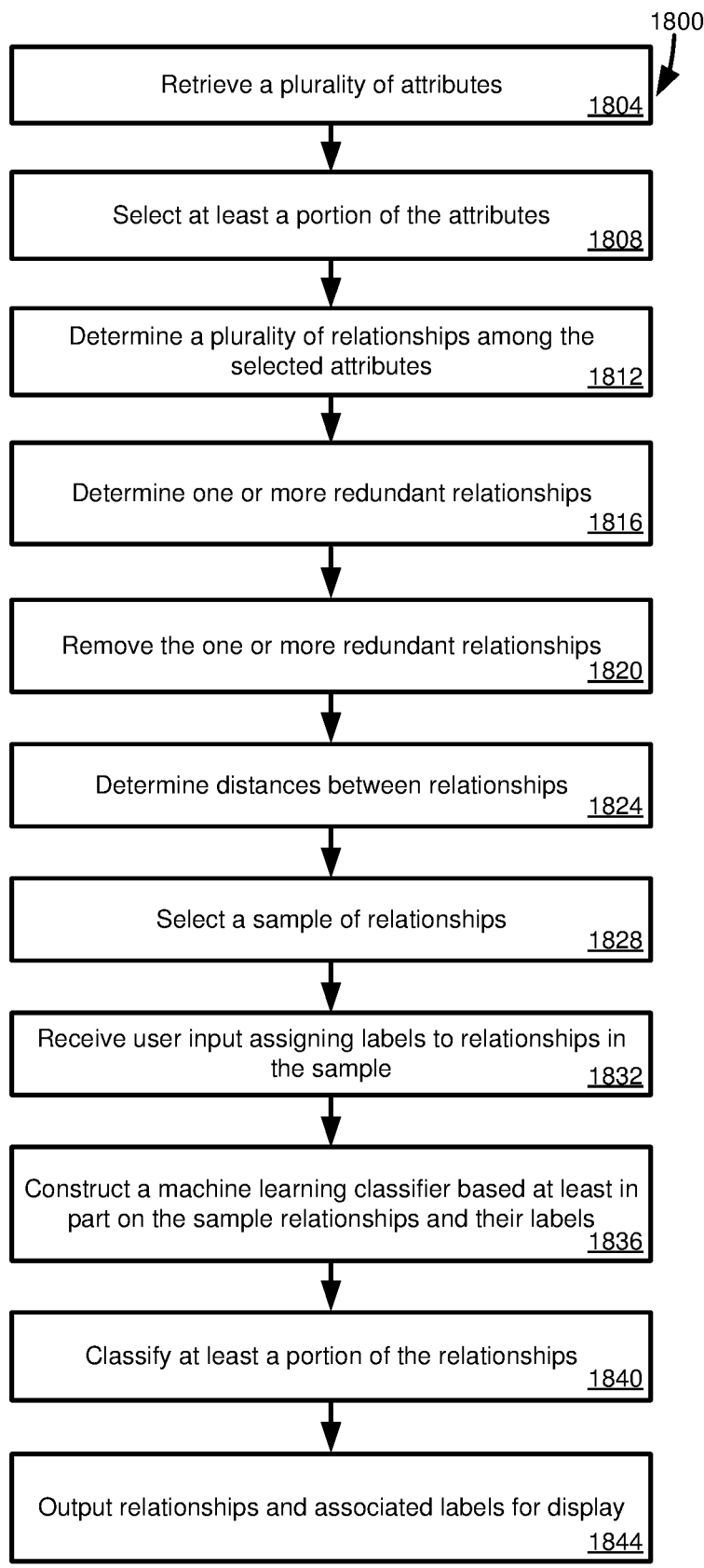
FIG. 18 is a flowchart illustrating operations in a method of automatically labelling data relationships using a machine learning classifier in a process that can provide improved efficiency.

FIG. 18 is a flowchart of an example method 1800 of automatically labelling data relationships using a machine learning classifier in a process that can provide improved efficiency. In some aspects, the method 1800 can be carried out using the computing environment 1600 or the architecture 1700.

At 1804, a plurality of attributes, or fields, are retrieved for at least one database table. At least a portion of the attributes are selected at 1808. The selected attributes are those to be analyzed for relationships among the selected attributes. A plurality of relationships among the selected at least a portion of the attributes are determined at 1812. At 1816, one or more redundant relationships of the plurality of determined relationships are determined. The one or more redundant relationships are removed at 1820 from a set that includes the plurality of determined relationships. At 1824, distances are determined between relationships of the set. The distances are calculated using rule antecedents and rule consequents of the relationships, or otherwise using attribute values that constitute the relationships.

A sample of relationships is selected from the set at 1828. The sample includes multiple relationships of the relationships in the set, but less than all of them. At 1832, user input is received assigning labels to relationships of the sample. A machine learning classifier is constructed, or trained, at 1836 based at least in part on the relationships of the sample and their associated labels. At 1840 at least a portion of the relationships of the set are classified using the machine learning classifier. The classifying includes determining labels for relationships of the set and associating the labels with respective relationships. At least a portion of the relationships classified by the machine learning classifier, and their associated labels, are output for display at 1844.

Figure 19:
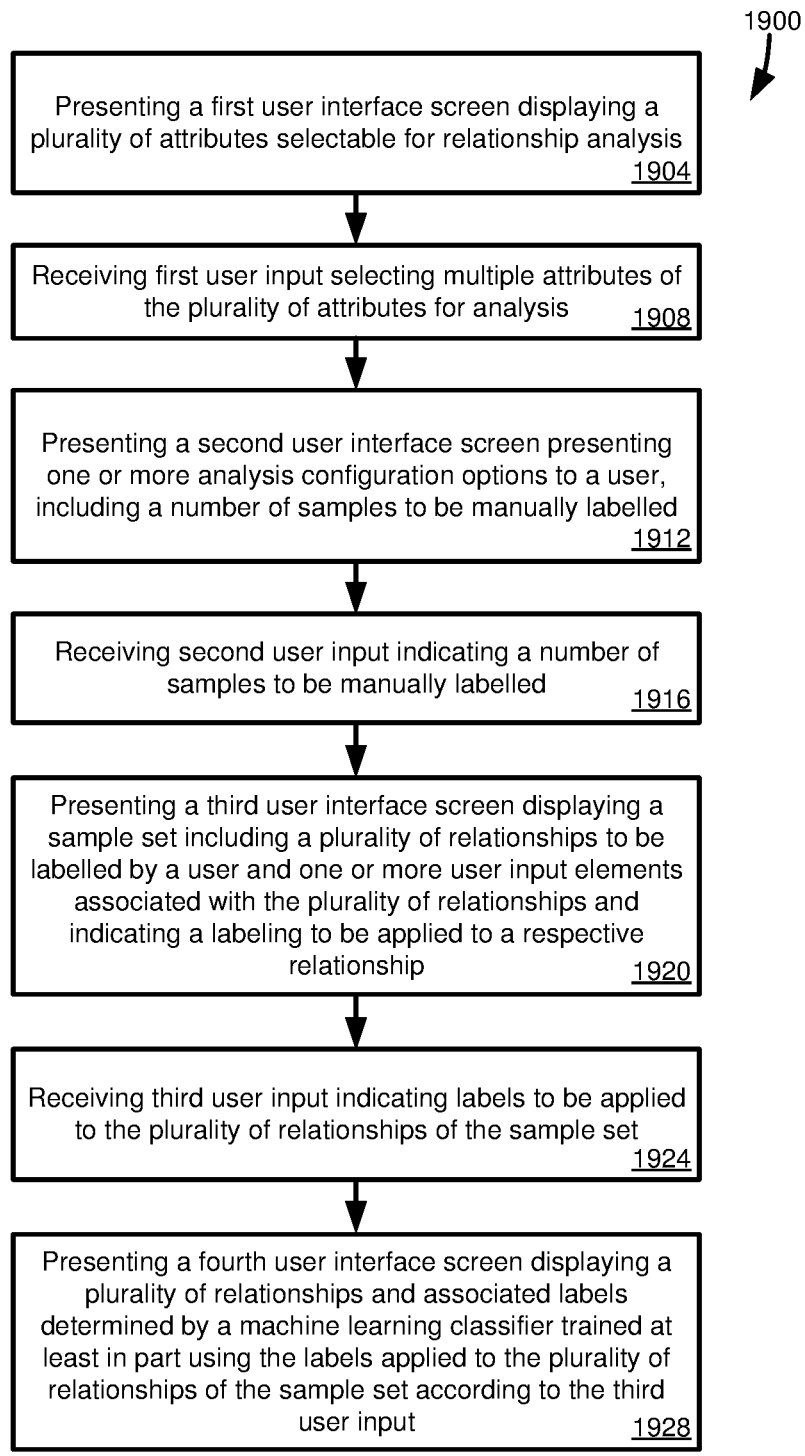
FIG. 19 is a flowchart illustrating operations in a method of implementing a wizard that can be presented to a user to guide the user through the process of automatically determining and labelling relationships between attributes, or fields, associated with data.

FIG. 19 is a flowchart of a method 1900 for implementing a wizard that can be presented to a user to guide the user through the process of automatically determining and labelling relationships between attributes, or fields, associated with data. In some aspects, the method 1900 can be carried out using the computing environment 1600 or the architecture 1700. In further aspects, the wizard can include one or more, including all, of the screens 1000-1500 of FIGS. 10-15.

At 1904 a first user interface screen is presented. The first user interface screen displays a plurality of attributes, such as fields of one or more relational database tables, which are selectable for relationship analysis. First user input is received at 1908 selecting multiple attributes of the plurality of attributes for analysis. At 1912, a second user interface screen is presented. The second user interface screen presents one or more analysis configuration options to a user. The one or more analysis configuration options include a number of samples to be manually labelled. Second user input is received at 1916, indicating a number of samples to be manually labelled.

At 1920, a third user interface screen is presented. The third user interface screen displays a sample set that includes a plurality of relationships to be labelled by a user and one or more user input elements associated with the plurality of relationships and indicating a labelling to be applied to a respective relationship. Third user input is received at 1924 indicating labels to be applied to the plurality of relationships of the sample set.

At 1928 a fourth user interface screen is presented. The fourth user interface screen displays a plurality of relationships and associated labels determined by a machine learning classifier trained at least in part using the labels applied to the plurality of relationships of the sample set.

Figure 20:
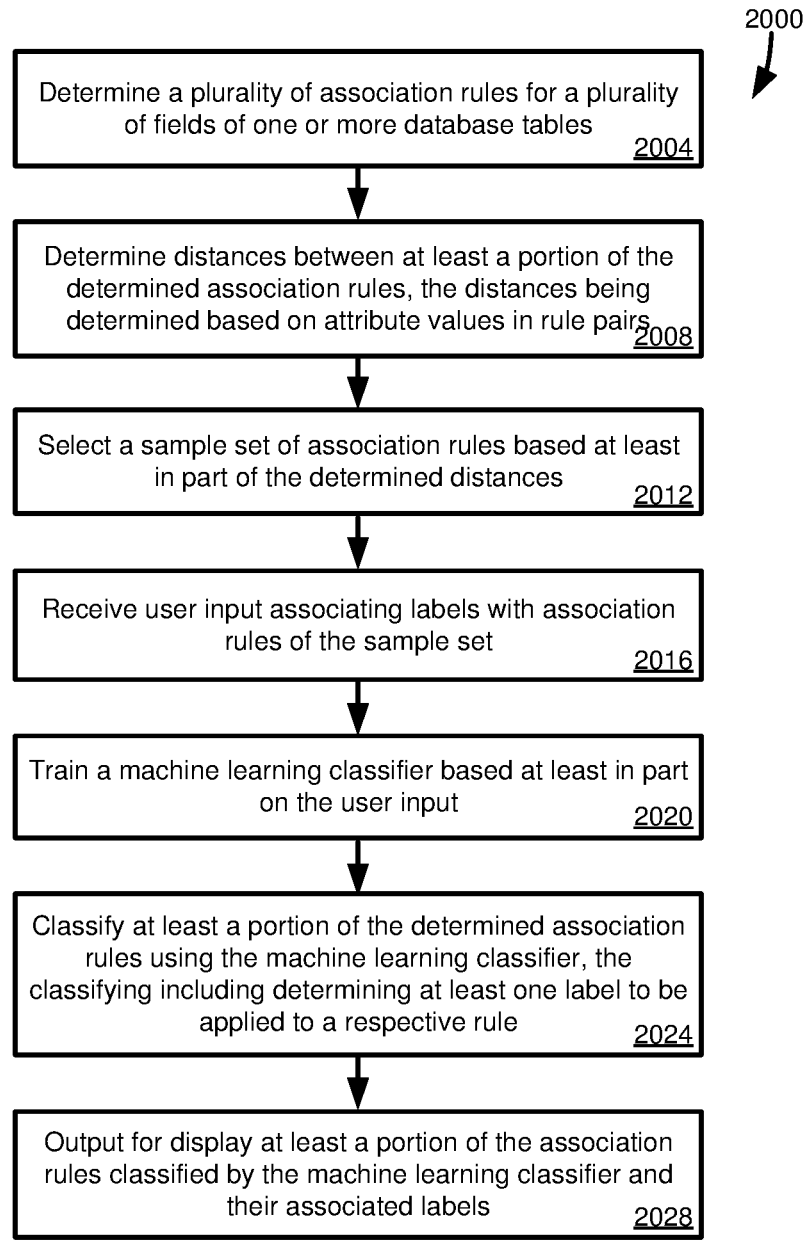
FIG. 20 is a flowchart illustrating operations in a method of automatically labelling association rules determined from one or more database tables.

FIG. 20 is a flowchart of a method 2000 for automatically labelling, or categorizing, association rules determined from attributes of one or more database tables. In some aspects, the method 2000 can be carried out using the computing environment 1600 or the architecture 1700.

At 2004, a plurality of association rules for a plurality of fields of one or more database tables are determined. Distances between at least a portion of the determined association rules are determined at 2008. The distances are determined based on attribute values in rule pairs. At 2012, a sample set of association rules is selected based at least in part on the determined distances. User input associating labels with association rules of the sample set is received at 2016. A machine learning classifier is trained at 2020 based at least in part on the user input. At 2024, at least a portion of the determined association rules are classified using the machine learning classifier. The classifying includes determining at least one label to be applied to a respective rule. At least a portion of the association rules classified by the machine learning classifier, and their associated labels, are output for display at 2028.

Example 10—Computing Systems

Figure 21:
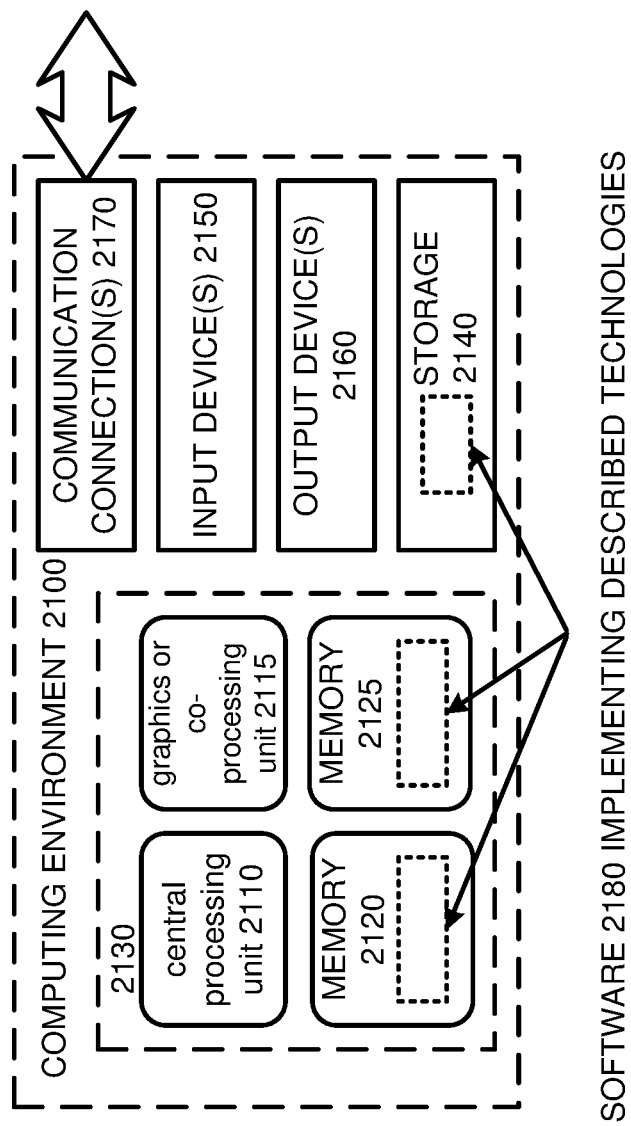
FIG. 21 is a diagram of an example computing system in which some described embodiments can be implemented.

FIG. 21 depicts a generalized example of a suitable computing system 2100 in which the described innovations may be implemented. The computing system 2100 is not intended to suggest any limitation as to scope of use or functionality of the present disclosure, as the innovations may be implemented in diverse general-purpose or special-purpose computing systems.

With reference to FIG. 21, the computing system 2100 includes one or more processing units 2110, 2115 and memory 2120, 2125. In FIG. 21, this basic configuration 2130 is included within a dashed line. The processing units 2110, 2115 execute computer-executable instructions, such as for implementing components of the computing environment 1600 of FIG. 16 or the computing environment 1700 of FIG. 17. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 21 shows a central processing unit 2110 as well as a graphics processing unit or co-processing unit 2115. The tangible memory 2120, 2125 may be volatile memory (e.g., registers, cache, RAM), non-volatile memory (e.g., ROM, EEPROM, flash memory, etc.), or some combination of the two, accessible by the processing unit(s) 2110, 2115. The memory 2120, 2125 stores software 2180 implementing one or more innovations described herein, in the form of computer-executable instructions suitable for execution by the processing unit(s) 2110, 2115.

A computing system 2100 may have additional features. For example, the computing system 2100 includes storage 2140, one or more input devices 2150, one or more output devices 2160, and one or more communication connections 2170. An interconnection mechanism (not shown) such as a bus, controller, or network interconnects the components of the computing system 2100. Typically, operating system software (not shown) provides an operating environment for other software executing in the computing system 2100, and coordinates activities of the components of the computing system 2100.

The tangible storage 2140 may be removable or non-removable, and includes magnetic disks, magnetic tapes or cassettes, CD-ROMs, DVDs, or any other medium which can be used to store information in a non-transitory way and which can be accessed within the computing system 2100. The storage 2140 stores instructions for the software 2180 implementing one or more innovations described herein.

The input device(s) 2150 may be a touch input device such as a keyboard, mouse, pen, or trackball, a voice input device, a scanning device, or another device that provides input to the computing system 2100. The output device(s)

2160 may be a display, printer, speaker, CD-writer, or another device that provides output from the computing system 2100.

The communication connection(s) 2170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 22:
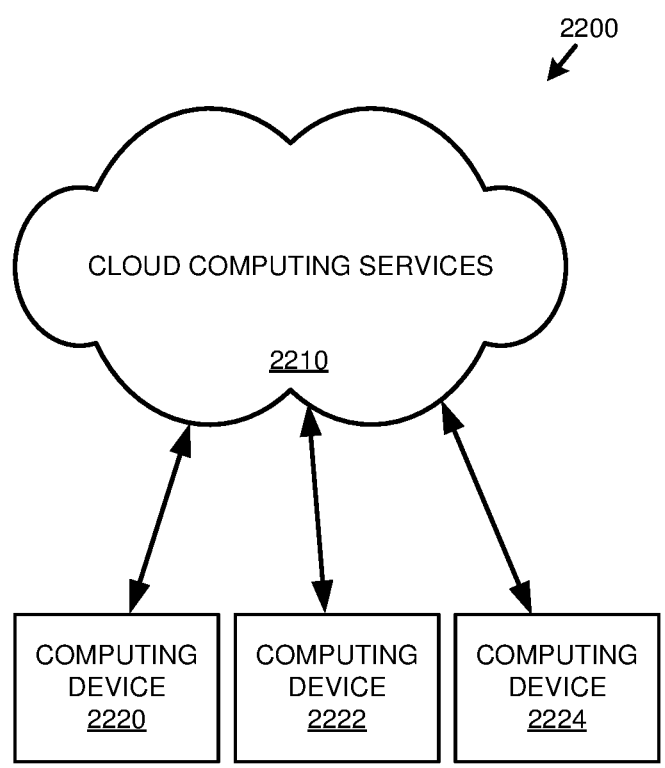
FIG. 22 is an example cloud computing environment that can be used in conjunction with the technologies described herein.

FIG. 22 depicts an example cloud computing environment 2200 in which the described technologies can be implemented. The cloud computing environment 2200 comprises cloud computing services 2210. The cloud computing services 2210 can comprise various types of cloud computing resources, such as computer servers, data storage repositories, networking resources, etc. The cloud computing services 2210 can be centrally located (e.g., provided by a data center of a business or organization) or distributed (e.g., provided by various computing resources located at different locations, such as different data centers and/or located in different cities or countries).

The cloud computing services 2210 are utilized by various types of computing devices (e.g., client computing devices), such as computing devices 2220, 2222, and 2224. For example, the computing devices (e.g., 2220, 2222, and 2224) can be computers (e.g., desktop or laptop computers), mobile devices (e.g., tablet computers or smart phones), or other types of computing devices. For example, the computing devices (e.g., 2220, 2222, and 2224) can utilize the cloud computing services 2210 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 21, computer-readable storage media include memory 2120 and 2125, and storage 2140. The term computer-readable storage media does not include signals and carrier waves. In addition, the term computer-readable storage media does not include communication connections (e.g., 2170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by a computing device comprising at least one hardware processor and at least one memory coupled to the at least one hardware processor, comprising:

retrieving a plurality of attributes of at least a data store accessible to the at least one hardware processor;

selecting at least a portion of the attributes to be analyzed for association rules among the attributes of the at least a portion of the attributes;

determining a plurality of association rules between the attributes of the selected at least a portion of the attributes;

determining one or more redundant association rules of the plurality of association rules, the determining one or more redundant association rules comprising determining if a first association rule can be made to have identical antecedents and consequents as a second association rule by adding antecedents or consequents to the first association rule or by removing antecedents or consequents from the first association rule;

removing the one or more redundant association rules from a set comprising the plurality of association rules;

determining distances between association rules of the set to provide determined distances, the determined distances being calculated using rule antecedents and rule consequents of given association rules of the association rules of the set;

selecting a sample of association rules from the set based at least in part on the determined distances, the sample comprising a plurality of the association rules of the set but less than all of the association rules of the set;

rendering for display to a user association rules of the sample and one or more graphical user interface elements selectable by a user to assign a label to association rules of the sample;

receiving user input assigning labels to at least a portion of association rules of the sample;

constructing a machine learning classifier based at least in part on the at least a portion of association rules of the sample and their associated labels;

classifying at least a portion of the association rules of the set not in the at least a portion of association rules of the sample using the machine learning classifier, the classifying comprising determining labels for association rules of the set and associating the labels with respective association rules; and outputting for display at least a portion of the association rules classified by the machine learning classifier and their associated labels.

2. The method of claim 1, wherein the determined distances are calculated as the Jaccard distance.

3. The method of claim 1, wherein selecting a sample of association rules from the set comprising clustering at least a portion of the association rules of the set and selecting the sample from the clusters.

4. The method of claim 1, wherein selecting a sample of association rules from the set comprises Convex-Hull sampling.

5. The method of claim 1, wherein selecting a sample of association rules from the set comprises selecting association rules from the plurality of association rules that are the most diverse, as measured by their determined distances.

6. The method of claim 1, the operations further comprising:

determining a diversity value for the retrieved attributes;

wherein selecting at least a portion of the attributes comprises selecting attributes satisfying a threshold diversity.

7. The method of claim 1, the operations further comprising:

receiving user input changing a label associated with a classified association rule; and retraining the machine learning classifier using the changed label and its associated association rule.

8. The method of claim 1, the operations further comprising:

encoding attribute values associated with the at least one database table and the selected at least a portion of the attributes; and replacing attributes values of the selected at least a portion of the attributes with encoded values.

9. The method of claim 8, the operations further comprising:

preparing a plurality of tuples, each tuple comprising an identifier for a row of the at least one database table and an encoded attribute value for an attribute associated with an attribute of the respective row.

10. The method of claim 1, the operations further comprising:

preparing a plurality of tuples, each tuple comprising an identifier for a row of the at least one database table and an attribute value for an attributed associated with an attribute of the respective row.

11. The method of claim 1, the operations further comprising:
forming a binary rule matrix indicating the presence or absence of attributes in the set of association rules.

12. The method of claim 1, the operations further comprising:
forming distance matrix indicating distances between association rules of the set of association rules.

13. The method of claim 1, wherein determining a plurality of association rules comprises performing association rule mining on the selected at least a portion of the attributes.

14. A computing system comprising:
a memory;
one or more hardware processing units coupled to the memory; and
one or more non-transitory computer readable storage media storing instructions that, when executed, cause the computing system to perform operations comprising:
retrieving a plurality of attributes from a data store accessible to at least one of the one or more hardware processors;
selecting at least a portion of the attributes to be analyzed for association rules among the attributes of the at least a portion of the attributes;
determining a plurality of association rules between the attributes of the selected at least a portion of the attributes;
determining distances between association rules of the set to provide determined distances, the determined distances being calculated using rule antecedents and rule consequents of given association rules of the association rules of the set;
selecting a sample of association rules from the set, the sample comprising a plurality of the association rules of the set but less than all of the association rules of the set;
rendering for display to a user association rules of the sample and one or more graphical user interface elements selectable by a user to assign a label to association rules of the sample;
receiving user input assigning labels to at least a portion of association rules of the sample;
constructing a machine learning classifier based at least in part on the at least a portion of association rules of the sample and their associated labels; and
classifying at least a portion of the association rules of the set not in the at least a portion of association rules of the sample using the machine learning classifier, the classifying comprising determining labels for association rules of the set and associating the labels with respective association rules.

15. The computing system of claim 14, the operations further comprising:
determining one or more redundant association rules of the plurality of association rules, the determining one or more redundant association rules comprising determining if a first association rule can be made to have identical antecedents and consequents as a second association rule by adding antecedents or consequents to the first association rule or by removing antecedents or consequents from the first association rule; and
removing the one or more redundant association rules from a set comprising the plurality of association rules.

16. The computing system of claim 14, wherein the one or more graphical user interface elements are selectable by a user to assign a label from a set of a plurality of defined labels to association rules of the sample.

17. The computing system of claim 14, the operations further comprising:
determining a diversity value for the retrieved attributes;
wherein selecting at least a portion of the attributes comprises selecting attributes satisfying a threshold diversity.

18. One or more computer readable storage medium comprising:
computer-executable instructions that, when executed by a computing system comprising one or more hardware processors and at least one memory coupled to the one or more hardware processors, cause the computing system to retrieve a plurality of attributes from a data store accessible to at least one of the one or more hardware processors;
computer-executable instructions that, when executed by the computing system, cause the computing system to determine a plurality of association rules between the attributes of the selected at least a portion of the attributes;
computer-executable instructions that, when executed by the computing system, cause the computing system to determine distances between association rules of the set to provide determined distances, the determined distances being calculated using rule antecedents and rule consequents of given association rules of the association rules of the set;
computer-executable instructions that, when executed by the computing system, cause the computing system to select a sample of association rules from the set based at least in part on the determined distances, the sample comprising a plurality of the association rules of the set but less than all of the association rules of the set;
computer-executable instructions that, when executed by the computing system, cause the computing system to render for display to a user association rules of the sample and one or more graphical user interface elements selectable by a user to assign a label to association rules of the sample, the labels indicating a relevance of a given association rule to a classification result desired by the user;
computer-executable instructions that, when executed by the computing system, cause the computing system to receive user input assigning labels to at least a portion of association rules of the sample;
computer-executable instructions that, when executed by the computing system, cause the computing system to construct a machine learning classifier based at least in part on the at least a portion of association rules of the sample and their associated labels; and
computer-executable instructions that, when executed by the computing system, cause the computing system to classify at least a portion of the association rules of the set not in the at least a portion of association rules of the sample using the machine learning classifier, the classifying comprising determining labels for association rules of the set and associating the labels with respective association rules.

19. The one or more computer readable storage medium of claim 18, wherein the one or more graphical user interface elements are selectable by a user to apply a label from a set of predefined labels to given association rules of the sample.

20. The method of claim 1, wherein the one or more graphical user interface elements are selectable by a user to assign a label of a predefined set of labels to association rules of the sample.

\* \* \* \* \*